US012463869B2

(12) United States Patent
Yoshida et al.

(10) Patent No.: US 12,463,869 B2
(45) Date of Patent: Nov. 4, 2025

(54) RELAY DEVICE INSERTING APPARATUS POSITION INFORMATION IN PACKET

(71) Applicant: Panasonic Intellectual Property Corporation of America, Torrance, CA (US)

(72) Inventors: Moe Yoshida, Osaka (JP); Toshimasa Takaki, Osaka (JP); Naoki Ochi, Osaka (JP)

(73) Assignee: PANASONIC INTELLECTUAL PROPERTY CORPORATION OF AMERICA, Torrance, CA (US)

(*) Notice: Subject to any disclaimer, the term of this patent is extended or adjusted under 35 U.S.C. 154(b) by 0 days.

(21) Appl. No.: 18/390,501

(22) Filed: Dec. 20, 2023

(65) Prior Publication Data

US 2024/0129191 A1  Apr. 18, 2024

Related U.S. Application Data

(63) Continuation of application No. PCT/JP2022/018127, filed on Apr. 19, 2022.

(30) Foreign Application Priority Data

Jul. 5, 2021  (JP) ................. 2021-111217

(51) Int. Cl.
*H04L 41/085* (2022.01)
*H04L 61/103* (2022.01)
*H04L 101/622* (2022.01)

(52) U.S. Cl.
CPC .......... *H04L 41/085* (2013.01); *H04L 61/103* (2013.01); *H04L 2101/622* (2022.05)

(58) Field of Classification Search
CPC ................. H04L 2101/622; H04L 41/085; H04L 61/103
(Continued)

(56) References Cited

U.S. PATENT DOCUMENTS

2005/0004946 A1\*  1/2005  Kawamoto ............. G06F 16/48
2010/0165999 A1   7/2010  Tchepnda et al.
(Continued)

FOREIGN PATENT DOCUMENTS

JP  2007-318432     12/2007
JP  2012085065 A *  4/2012
(Continued)

OTHER PUBLICATIONS

Machine English translation of JP-2014195197-A using Google Chrome, pp. 1-14, 2014 (Year: 2014).*
(Continued)

*Primary Examiner* — David P Zarka
(74) *Attorney, Agent, or Firm* — Greenblum & Bernstein, P.L.C.

(57) ABSTRACT

A position information relay device interposed between a network device and an apparatus includes: a position information recognizer which recognizes position information of the apparatus; and a position information relay which receives a communication packet transmitted by the apparatus to the network device, includes the position information in the communication packet received, and transmits the communication packet including the position information to the network device.

14 Claims, 16 Drawing Sheets

(58) Field of Classification Search
USPC .......................................................... 709/223
See application file for complete search history.

(56) References Cited

U.S. PATENT DOCUMENTS

| | | | | |
|---|---|---|---|---|
| 2017/0034468 | A1* | 2/2017 | Won | G06F 3/0482 |
| 2018/0198639 | A1* | 7/2018 | Ishizaka | H04W 4/33 |
| 2019/0132277 | A1* | 5/2019 | Keshava | H04L 61/5007 |
| 2020/0379119 | A1* | 12/2020 | Muramatsu | G01S 19/24 |
| 2021/0120516 | A1* | 4/2021 | Wang | G01S 5/14 |

FOREIGN PATENT DOCUMENTS

| | | | |
|---|---|---|---|
| JP | 2014-195197 | | 10/2014 |
| JP | 2014195197 | A * | 10/2014 |
| JP | 2019-186846 | | 10/2019 |
| JP | 2020-016998 | | 1/2020 |
| JP | 2020-047548 | | 3/2020 |

OTHER PUBLICATIONS

Machine English translation of JP-2012085065-A using Clarivate Analytics, pp. 1-15, 2012 (Year: 2012).*

Supplementary European Search Report for App. No. EP 22 83 7321, dated Oct. 10, 2024.

International Search Report issued in International Pat. Appl. No. PCT/JP2022/018127, dated Aug. 2, 2022, along with an English language translation thereof.

* cited by examiner

| Apparatus | IP address | MAC address |
|---|---|---|
| Apparatus 41 | 192.168.1.41 | 00:00:5E:00:53:41 |
| Apparatus 42 | 192.168.1.42 | 00:00:5E:00:53:42 |
| Apparatus 43 | 192.168.1.43 | 00:00:5E:00:53:43 |
| Apparatus 44 | 192.168.1.44 | 00:00:5E:00:53:44 |
| Position information acquisition terminal 20 | 192.168.1.20 | 00:00:5E:00:53:20 |

| IP address | MAC address | Physical position information |
|---|---|---|
| 192.168.1.41 | 00:00:5E:00:53:41 | 1A |
| 192.168.1.42 | 00:00:5E:00:53:42 | 1B |
| 192.168.1.43 | 00:00:5E:00:53:43 | 2A |
| 192.168.1.44 | 00:00:5E:00:53:44 | None |

FIG. 6

| Source MAC address | Management flag |
|---|---|
| 00:00:5E:00:53:99 | OFF |
| 00:00:5E:00:53:20 | ON |
| 00:00:5E:00:53:98 | OFF |
| 00:00:5E:00:53:97 | OFF |
| 00:00:5E:00:53:96 | OFF |

RELAY DEVICE INSERTING APPARATUS POSITION INFORMATION IN PACKET

CROSS REFERENCE TO RELATED APPLICATIONS

This is a continuation application of PCT International Application No. PCT/JP2022/018127 filed on Apr. 19, 2022, designating the United States of America, which is based on and claims priority of Japanese Patent Application No. 2021-111217 filed on Jul. 5, 2021. The entire disclosures of the above-identified applications, including the specifications, drawings and claims are incorporated herein by reference in their entirety.

FIELD

The present disclosure relates to a position information relay device, a position information acquisition system, a position information relay method, and a recording medium.

BACKGROUND

A technique is provided in which position information of a terminal connected to a network can be automatically acquired (see Patent Literature (PTL) 1).

CITATION LIST

Patent Literature

PTL 1: Japanese Unexamined Patent Application Publication No. 2007-318432

SUMMARY

Technical Problem

However, the technique disclosed in PTL 1 is not applicable to a switching hub which do not correspond to an SNMP. Hence, disadvantageously, it is likely that the technique disclosed in PTL 1 cannot be additionally introduced into an already installed network.

Therefore, the present disclosure provides a position information relay device and the like which contribute to recognizing of position information of an apparatus that is connected.

Solution to Problem

A position information relay device according to an aspect of the present disclosure is a position information relay device interposed between a network device and an apparatus, and the position information relay device includes: a recognizer that recognizes position information of the apparatus; and a relay that receives a communication packet transmitted by the apparatus to the network device, includes the position information in the communication packet received, and transmits the communication packet including the position information to the network device.

The comprehensive or specific aspect described above may be realized by a system, a method, an integrated circuit, a computer program, or a computer-readable recording medium such as a CD-ROM or may be realized by any combination of a system, a method, an integrated circuit, a computer program, and a recording medium.

Advantageous Effects

The position information relay device of the present disclosure contributes to recognizing of position information of an apparatus which is connected.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 6 is a diagram showing an example of a position information conversion list in the embodiment.

DESCRIPTION OF EMBODIMENTS

Figure 1:
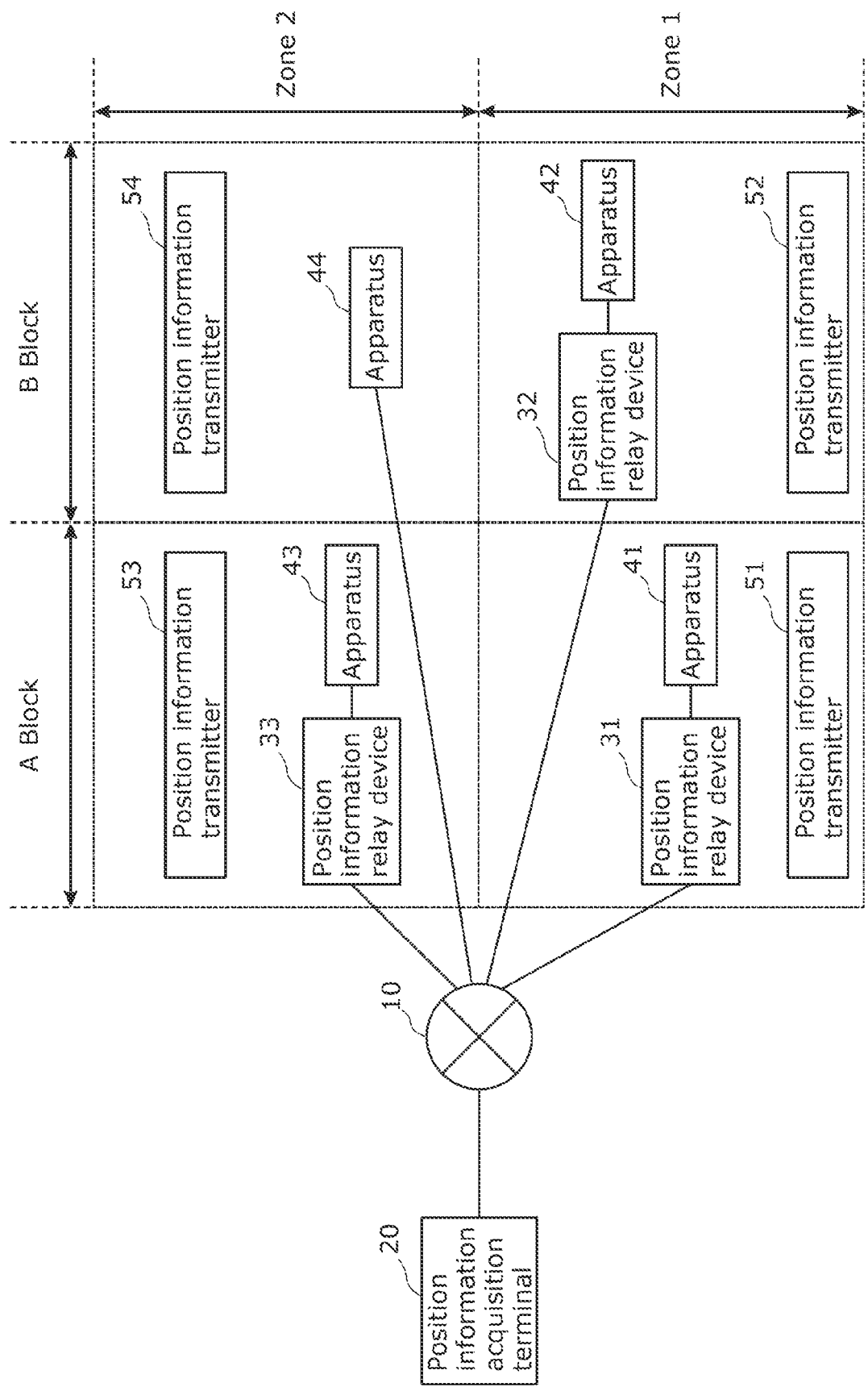
FIG. 1 is an overall configuration diagram of a position information acquisition system in an embodiment.

Underlying Knowledge Forming Basis of the Present Disclosure

The present inventors have found that the following problems occur on the technique described in the "Background Art".

In recent years, a movement toward smart factories has become active both domestically and internationally, and apparatuses or devices in factories have been being connected to networks.

A conventional factory network is basically separated from the Internet or an in-house local area network (LAN) to have a closed network configuration.

However, in recent years, operation data of apparatuses in a factory has often been collected in a cloud, and operation conditions have been visualized and utilized for the purpose of early detection of problems or performance management of the entire factory, with the result that apparatuses or devices in factories are increasingly connected to an in-house LAN or the Internet.

Hence, apparatuses or devices in factories may be targets of cyber attacks, and there are actually a large number of cases of cyber attacks targeting factory networks.

In security for information technology (IT) such as personal computers (PC) in offices, it is possible to introduce virus inspection software. On the other hand, since the availability of factory apparatuses is of the utmost importance, it is difficult to take measures such as the introduction of virus inspection software, regular patch application, or the updating of an operating system (OS) which may cause stop of a system.

Hence, it is important to take measures to strengthen cyber resilience with the assumption that factory apparatuses are in a vulnerable state. As one of the measures, a solution is provided which monitors communication traffic flowing in a factory network in real time, and detects abnormalities in apparatuses in a factory caused by unauthorized access, virus infection, or the like. The solution described above makes it possible to minimize damage when detecting an abnormality by taking measures such as immediately shutting off the communication of the relevant apparatus.

In general, a network address such as an Internet Protocol (IP) address or a media access control (MAC) address is used as an identifier for identifying an apparatus in which an abnormality has occurred. However, if a determination is not made immediately as to which apparatus in the factory a network address is associated with, a response may be delayed to cause severe damage.

Hence, in order to quickly respond to an abnormality in an apparatus in a factory, it is important that the network address of the apparatus and the physical position of the apparatus be managed so as to be associated with each other. However, the reality is that there are many factories where this management is not properly performed.

When a new factory network is configured, a list may be created and managed which associates apparatuses with the physical positions of the apparatuses. However, when after the creation of the list, a new apparatus is added or the position of an apparatus is changed due to a factory line change or the like, an update is missed, with the result that in some cases, when the physical position of an apparatus needs to be known, the physical position of the apparatus is not known and no action is taken.

As described above, it is not easy to manually manage the physical position information of apparatuses in a factory for many years.

Incidentally, a technique is provided in which position information of a terminal connected to a network can be automatically acquired (see PTL 1). In the technique described above, a table which associates the port of a switching hub with a switching hub connected to the port, an access point, or position information of a terminal apparatus is previously prepared in a position information management server. Then, an operation of using a simple network management protocol (SNMP) to read route information including the MAC addresses of a port and an apparatus connected to the port is performed sequentially from an upstream switching hub toward a downstream switching hub, apparatuses connected to individual ports are sequentially traced, and the resulting information is compared with the table, with the result that the current position of the terminal apparatus is determined.

In the technique disclosed in PTL 1, a network protocol is used, and thus it is possible to automatically acquire position information of a terminal apparatus. Even when not only a wired apparatus but also a wirelessly connected apparatus is moved, it is possible to follow the apparatus to acquire the position information thereof. Hence, even when the location of an apparatus is changed due to a factory line change or the like, the acquisition of the position information of the terminal apparatus can be continued.

However, in the technique disclosed in PTL 1, the switching hubs need to correspond to the SNMP, and in other words, the technique is not applicable to a switching hub which do not correspond to the SNMP.

Currently, there are very few commercially available switching hubs which correspond to the SNMP. Furthermore, when a factory network is already configured with switching hubs which do not correspond to the SNMP, they need to be replaced with switching hubs which correspond to the SNMP. However, it is difficult to perform this replacement because the factory network needs to be stopped for the replacement.

Hence, disadvantageously, it is likely that the technique disclosed in PTL 1 cannot be additionally introduced into an already installed network.

Although the table which associates the port of a switching hub with a switching hub connected to the port, an access point, or position information of a terminal apparatus needs to be previously prepared in the position information management server, when a switching hub is moved due to a factory line change or the like, the consistency thereof is lost. Therefore, if the information in the table is not updated by regular maintenance of the position information management server, it does not contribute to recognizing of the correct position information.

The present disclosure provides a position information relay device and the like which contribute to appropriate recognizing of position information of an apparatus that is connected.

In order to solve the problem described above, a position information relay device according to an aspect of the present disclosure is a position information relay device interposed between a network device and an apparatus, and the position information relay device includes: a recognizer that recognizes position information of the apparatus; and a relay that receives a communication packet transmitted by the apparatus to the network device, includes the position information in the communication packet received, and transmits the communication packet including the position information to the network device.

In the aspect described above, since the position information relay device includes the recognized position information of the apparatus in the communication packet toward the network device from the apparatus, and transmits the position information, the position information relay device uses an existing network device and an existing apparatus to be able to transmit the position information of the apparatus. If when the position information relay device is introduced, a new network protocol needs to be used or new software needs to be installed in the apparatus, the availability may be lowered by change of settings of the network device or the apparatus, stop of the network for the addition of a function, a change in behavior caused by introduction, or the like. The position information relay device according to the aspect of the present disclosure does not change the existing network device and the existing apparatus so as to contribute to preventing a decrease in the availability. The position information relay device can also be smoothly applied to the existing network. Furthermore, it is not necessary to periodically perform maintenance on the existing network device and the existing apparatus, and thus it is possible to transmit accurate position information each time. As described above, the position information relay device contributes to recognizing of the position information of the apparatus which is connected.

For example, the position information relay device may be set within a predetermined distance from the apparatus, and the recognizer may include a sensor that acquires position information of the position information relay device, and recognize, as the position information of the apparatus, the position information of the position information relay device acquired by the sensor.

In the aspect described above, the position information relay device uses the sensor to be able to easily recognize the position information of the apparatus. Hence, the position information relay device contributes to recognizing of the position information of the apparatus which is connected in an easier manner.

For example, the relay may identify a command of a network protocol in which the communication packet received is used, determine whether the command of the network protocol identified is a predetermined command, and include the position information in a predetermined field included in the communication packet when determining that the command of the network protocol identified is the predetermined command.

In the aspect described above, since the position information relay device includes the position information in the predetermined field of the communication packet of the predetermined command of the network protocol toward the network device from the apparatus, it is not necessary to add a dedicated network protocol for transmitting the position information. If it is necessary to add a dedicated network protocol, it may be necessary to change settings of the network device or the apparatus or to add a function, with the result that this may contribute to lowering the availability. The position information relay device according to the aspect of the present disclosure does not add a dedicated network protocol so as to contribute to preventing a decrease in the availability. As described above, the position information relay device further contributes to recognizing of the position information of the apparatus which is connected.

For example, the apparatus may be connected to a management device via one or more network devices each being the network device, the management device may transmit, to the apparatus, a request packet including a request command determined by a network protocol, and the relay may receive the request packet and transmits the request packet to the apparatus, and receive, as the communication packet, a response packet transmitted by the apparatus to the management device as a response to the request packet, the response packet including a response command determined by the network protocol.

In the aspect described above, the position information relay device includes the position information of the apparatus in the response packet transmitted by the apparatus for the request packet transmitted by the management device, and transmits the position information. In this way, it is possible to determine timing at which the position information of the apparatus is transmitted based on control performed by the management device. The position information relay device transmits the position information with more appropriate timing so as to contribute to recognizing of the position information of the apparatus which is connected.

For example, the relay may determine whether a predetermined code is included in a predetermined field within the request packet received when receiving the request packet, receive, as the communication packet, the response packet in which the apparatus set as a destination of the request packet received is set as a source when determining that the predetermined code is included in the request packet received, include the position information in the communication packet received, and transmit the communication packet including the position information to the network device.

In the aspect described above, the position information relay device includes the position information of the apparatus in the response packet transmitted, based on the fact that the request packet including the predetermined code is received, thereafter by the apparatus of the destination of the request packet, and transmits the position information. The predetermined code can be set by the management device. In this way, it is possible to determine, based on the setting made by the management device, the apparatus which is the target whose position information is recognized. Hence, the position information relay device contributes to recognizing of the position information of the apparatus which is connected based on control performed by the management device.

For example, the recognizer may receive a signal, transmitted by a transmitter, that includes information specific to a position where the transmitter is set, and recognize the position information of the apparatus from the signal received.

In the aspect described above, the position information relay device receives the signal transmitted by the transmitter to easily recognize the position information of the apparatus. Hence, the position information relay device contributes to appropriate recognizing of the position information of the apparatus which is connected in an easier manner.

For example, the position information relay device may further include: a storage in which the position information recognized by the recognizer is held.

In the aspect described above, since the position information relay device can hold the position information of the apparatus, it is not necessary to recognize the position information of the apparatus each time, and thus it is possible to efficiently recognize the position information of the apparatus. Hence, the position information relay device contributes to appropriate and efficient recognizing of the position information of the apparatus which is connected.

For example, the network protocol may be an address resolution protocol (ARP).

In the aspect described above, the position information relay device uses the packet of the ARP to be able to transmit the position information of the apparatus. Since all the existing apparatuses connected to the network can perform the ARP communication, the position information relay device does not need to introduce the function of performing communication using a new network protocol, and can transmit the position information of the apparatus. Hence, the position information relay device contributes to recognizing of the position information of the apparatus which is connected.

In order to solve the problem described above, a position information acquisition system according to an aspect of the present disclosure includes: a network device; an apparatus; a management device that is connected to the apparatus via the network device; and the position information relay device that is interposed between the network device and the apparatus.

In the aspect described above, the same effects as the position information relay device are achieved.

For example, the management device may transmit, to the apparatus, a request packet including request information for requesting position information of the apparatus, the relay may receive the request packet transmitted by the management device, and transmits the request packet to the apparatus, the apparatus may receive the request packet and transmits a response packet to the management device as a response to the request packet, and the relay may receive, as the communication packet, the response packet transmitted by the apparatus, include the position information in the response packet received, and transmit the response packet including the position information to the management device.

In the aspect described above, the position information acquisition system includes the position information of the apparatus in the response packet transmitted by the apparatus for the request packet transmitted by the management device, and transmits the position information. In this way, the position information acquisition system can determine timing at which the position information of the apparatus is transmitted based on control performed by the management device. The position information acquisition system transmits the position information with more appropriate timing to contribute to recognizing of the position information of the apparatus which is connected.

For example, the management device may include a storage that stores an Internet Protocol (IP) address, a media access control (MAC) address, and the position information of the apparatus in association with each other.

In the aspect described above, the position information acquisition system can appropriately manage the IP address, the MAC address, and the position information of the apparatus. For example, when a cyberattack or malware infection of an apparatus is detected, the physical position information of the apparatus is set to an administrator or the like from the IP address of the apparatus, with the result that it is possible to contribute to rapid measures against the cyberattack or the like.

For example, the position information acquisition system may further include: a transmitter that transmits a signal including information specific to a position where the transmitter is set, and the transmitter may be set in a facility.

In the aspect described above, the position information acquisition system uses the signal transmitted by the transmitter installed in the facility to more contribute to recognizing of the position information of the apparatus.

For example, the position information acquisition system may further include: a transmitter that transmits a signal including information specific to a position where the transmitter is set, and the transmitter may be set outside a facility.

In the aspect described above, the position information acquisition system uses the signal transmitted by the transmitter installed outside the facility to more contribute to recognizing of the position information of the apparatus.

In order to solve the problem described above, a position information relay method according to an aspect of the present disclosure is a position information relay method performed by a position information relay device interposed between a network device and an apparatus, and the position information relay method includes: recognizing position information of the apparatus; receiving a communication packet transmitted by the apparatus to the network device; including the position information in the communication packet received; and transmitting the communication packet including the position information to the network device.

In the aspect described above, the same effects as the position information relay device are achieved.

In order to solve the problem described above, a recording medium according to an aspect of the present disclosure is a non-transitory computer-readable recording medium having recorded thereon a program causing a computer to execute the position information relay method described above.

In the aspect described above, the same effects as the position information relay device are achieved.

The comprehensive or specific aspect described above may be realized by a system, a method, an integrated circuit, a computer program, or a computer-readable recording medium such as a CD-ROM or may be realized by any combination of a system, a method, an integrated circuit, a computer program, and a recording medium.

An embodiment will be specifically described below with reference to drawings.

The embodiment described below indicates a comprehensive or specific example. Numerical values, shapes, materials, constituent elements, the arrangement and connection of the constituent elements, steps, the order of the steps, and the like shown in the following embodiment are examples, and are not intended to limit the present disclosure. Among the constituent elements in the following embodiment, constituent elements which are not recited in the independent claims indicating the highest level concepts are described as optional constituent elements.

Embodiment

In the present embodiment, a position information relay device which contributes to recognizing of position information of an apparatus which is connected will be described.

The position information relay device is introduced into an existing network (for example, a factory network), and contributes to appropriate recognizing of position information of an apparatus which is connected. When the position information relay device is introduced, it is not necessary to replace network apparatuses such as routers or switching hubs which make up the existing network. Hence, the position information relay device can be introduced without stopping the factory network which is already operated.

When the position information relay device is introduced, it is not necessary to install a program in apparatuses. The position information relay device is attached to the outside of the apparatuses to recognize the physical position information of the apparatuses instead of the apparatuses, and transmits the physical position information to a position information management terminal. In this way, the position information relay device can suppress an influence on the operation of the existing network.

[1. Details of Embodiment]

A position information acquisition system according to the present embodiment will be described with reference to drawings. In the present embodiment, for example, an illumination apparatus in a factory previously has data of physical position information. The position information relay device (for example, a dongle) connected to the apparatus in the factory acquires the physical position information of the apparatus from illumination light which is received, and transmits the position information to a position information acquisition terminal (such as a tablet). In this way, the position information acquisition terminal acquires the physical position of the apparatus in the factory.

[1.1 Overall Configuration of Position Information Acquisition System]

FIG. 1 is a diagram showing the network configuration of a position information acquisition system in a factory. The position information acquisition system includes factory network 10, position information acquisition terminal 20, position information relay devices 31, 32, and 33, apparatuses 41 to 44, and position information transmitters 51 to 54. Factory network 10 and apparatuses 41 to 44 do not need to be constituent elements of the position information acquisition system.

As an example, it is assumed that the factory is a one-story building and is divided into four areas, that is, block A of zone 1, block B of zone 1, block A of zone 2, and block B of zone 2. The factory is not limited to this area division, and may be a two-story building, and the number of areas into which the factory is divided may be other than 4.

Factory network 10 is a typically configured LAN, and includes one or more network devices such as routers or switching hubs which are commercially available. Although apparatuses 41 to 44 are generally connected to factory network 10 with an Ethernet (registered trademark) cable, apparatuses 41 to 44 may be connected by another transmission medium such as a wireless LAN or power line communications (PLC).

Apparatuses 41 to 44 are general computers (such as PCs), devices, or the like which are installed in a factory, and each of apparatuses 41 to 44 has an IP address and a MAC address.

Figures 2, 3:
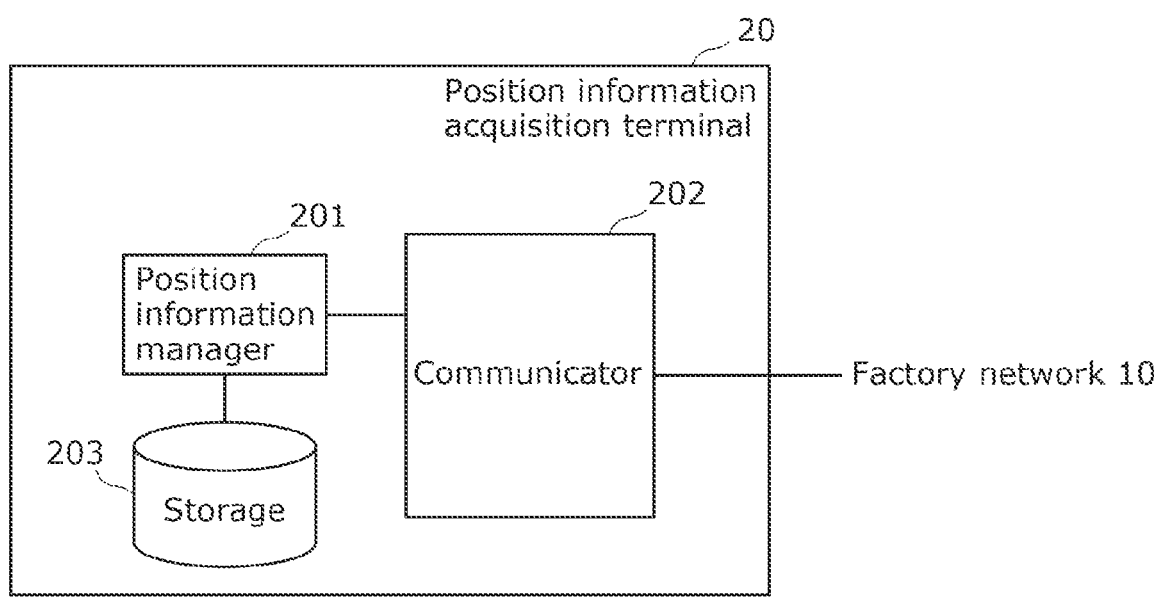
FIG. 2 is a diagram showing address information of apparatuses in the embodiment.
FIG. 3 is a configuration diagram of a position information acquisition terminal in the embodiment.

FIG. 2 is a diagram showing address information of position information acquisition terminal 20 and apparatuses 41 to 44 in the present embodiment.

In FIG. 2, the IP address of apparatus 41 is "192.168.1.41" and the MAC address thereof is "00:00:5E:00:53:41". The IP address of apparatus 42 is "192.168.1.42" and the MAC address thereof is "00:00:5E:00:53:42". The IP address of apparatus 43 is "192.168.1.43" and the MAC address thereof is "00:00:5E:00:53:43". The IP address of apparatus 44 is "192.168.1.44" and the MAC address thereof is "00:00:5E:00:53:44". The IP address of position information acquisition terminal 20 is "192.168.1.20" and the MAC address thereof is "00:00:5E:00:53:20".

The IP addresses may be dynamically assigned from a router or may be statically set.

A description will be further given with reference to FIG. 1. Position information acquisition terminal 20 corresponds to a management device (also simply referred to as the management device) which manages the physical positions of apparatuses installed in the factory. Position information acquisition terminal 20 has the function of using the IP address of a target apparatus installed in the factory to acquire the physical position information of the target apparatus.

Position information acquisition terminal 20 may be in the form of a server which is constantly connected to factory network 10 to regularly collect and manage the physical position information of the apparatuses in the factory, or may be in the form of a terminal such as a tablet which can perform wireless communication and connects to factory network 10 to acquire physical position information when it is desired to know the physical position information of a target apparatus.

Position information relay device 31 is installed near apparatus 41. For example, position information relay device 31 is installed in such a position that position information relay device 31 is recognized to be near apparatus 41 by a person who visually checks apparatus 41 installed in the factory, and in other words, position information relay device 31 is installed in a position within a predetermined distance (for example, within a few meters) from apparatus 41. The separation distance between apparatus 41 and position information relay device 31 is not limited to the distance described above.

Position information relay device 31 is connected to a communication line (for example, Ethernet) which connects factory network 10 and apparatus 41. In other words, position information relay device 31 is interposed between a network device included in factory network 10 and apparatus 41. Position information relay device 31 has the role of mediating communication between factory network 10 and apparatus 41. Specifically, position information relay device 31 receives all communication packets from factory network 10 to apparatus 41 and transfers them to apparatus 41, and receives communication packets from apparatus 41 and transfers them to factory network 10. Position information relay device 31 recognizes physical position information transmitted by any one of position information transmitters 51 to 54, and thereby recognizes the physical position information of apparatus 41. Here, position information relay device 31 recognizes physical position information transmitted by any one of position information transmitters 51 to 54, acquires the physical position information of position information relay device 31, and thereby recognizes the position information as the physical position information of apparatus 41.

When position information acquisition terminal 20 uses the IP address of apparatus 41 as a key to make an inquiry about physical position information, position information relay device 31 transmits the physical position information of apparatus 41 instead of apparatus 41.

Position information relay device 32 is installed near apparatus 42. A positional relationship between position information relay device 32 and apparatus 42 is the same as a positional relationship between position information relay device 31 and apparatus 41 in the above description.

Position information relay device 32 is connected to a communication line (for example, Ethernet) which connects factory network 10 and apparatus 42. Position information relay device 32 has the role of mediating communication between factory network 10 and apparatus 42. Specifically, position information relay device 32 receives all communication packets from factory network 10 to apparatus 42 and transfers them to apparatus 42, and receives communication packets from apparatus 42 and transfers them to factory network 10. Position information relay device 32 recognizes physical position information transmitted by any one of position information transmitters 51 to 54, and thereby recognizes the physical position information of apparatus 42. Here, position information relay device 32 recognizes physical position information transmitted by any one of position information transmitters 51 to 54, acquires the physical position information of position information relay device 32, and thereby recognizes the position information as the physical position information of apparatus 42.

When position information acquisition terminal 20 uses the IP address of apparatus 42 as a key to make an inquiry about physical position information, position information relay device 32 transmits the physical position information of apparatus 42 instead of apparatus 42.

Position information relay device 33 is installed near apparatus 43. A positional relationship between position information relay device 33 and apparatus 43 is the same as the positional relationship between position information relay device 31 and apparatus 41 in the above description.

Position information relay device 33 is connected to a communication line (for example, Ethernet) which connects factory network 10 and apparatus 43. Position information relay device 33 has the role of mediating communication between factory network 10 and apparatus 43. Specifically, position information relay device 33 receives all communication packets from factory network 10 to apparatus 43 and transfers them to apparatus 43, and receives communication packets from apparatus 43 and transfers them to factory network 10. Position information relay device 33 recognizes physical position information transmitted by any one of position information transmitters 51 to 54, and thereby recognizes the physical position information of apparatus 43. Here, position information relay device 33 recognizes physical position information transmitted by any one of position information transmitters 51 to 54, acquires the physical position information of position information relay device 33, and thereby recognizes the position information as the physical position information of apparatus 43.

When position information acquisition terminal 20 uses the IP address of apparatus 43 as a key to make an inquiry about physical position information, position information relay device 33 transmits the physical position information of apparatus 43 instead of apparatus 43.

As described above, position information relay devices 31, 32, and 33 are connected to factory network 10 and apparatuses 41, 42, and 43 with the communication line such as the Ethernet cable, and thereby perform IP communication. Here, position information relay device 31 performs communication instead of apparatus 41, position information relay device 32 performs communication instead of apparatus 42, and position information relay device 33 performs communication instead of apparatus 43. Specifically, position information relay devices 31, 32, and 33 each use the IP addresses or the MAC addresses of apparatuses 41, 42, and 43 as source IP addresses or source MAC addresses to transmit communication packets. Hence, position information relay devices 31, 32, and 33 each do not need to have the IP addresses or the MAC addresses.

However, protocol stack restrictions may prevent communication from being performed when position information relay devices 31, 32, and 33 do not have the IP addresses and the MAC addresses. In such a case, position information relay devices 31, 32, and 33 each may have the IP addresses and the MAC addresses.

Electric power for each of position information relay devices 31, 32, and 33 may be supplied from a power outlet or may be supplied from Power over Ethernet (PoE) through the Ethernet cable.

Position information transmitters 51 to 54 are respectively installed in the four divided areas, and each of position information transmitters 51 to 54 transmits physical position information indicating the area in which the position information transmitter is installed. For example, position information transmitter 51 is installed in block A of zone 1 to transmit "1A" as the physical position information. Position information transmitter 52 is installed in block B of zone 1 to transmit "1B" as the physical position information. Position information transmitter 53 is installed in block A of zone 2 to transmit "2A" as the physical position information. Position information transmitter 54 is installed in block B of zone 2 to transmit "2B" as the physical position information.

Although the example is shown where as the physical position information, a character string such as "1A", "1B", or "2B" obtained by combining a zone identifier (1 or 2) and a block identifier (A or B) is used, the position information is not limited to this example, and a character string or a number by which the physical position can be identified may be used.

Each of position information transmitters 51 to 54 transmits a signal (also referred to as the position information signal) including information specific to the position in which the position information transmitter is installed. Each of position information transmitters 51 to 54 is, for example, an illumination apparatus, previously has data of physical position information indicating the areas, modulates illumination light based on the data of the position information, and outputs the modulated illumination light using light emitting diodes (LED) or the like.

A method for transmitting the physical position information by position information transmitters 51 to 54 is not limited to this method. For example, the physical position information may be transmitted by utilization of short-range wireless communication such as near field communication (NFC), radio frequency identification (RFID), infrared rays, specified low power radio, Bluetooth (registered trademark), Wi-Fi (registered trademark), Wi-SUN (registered trademark), or ZigBee (registered trademark). The physical position information may also be transmitted by utilization of units in facilities, and examples of the method include a method of embedding the physical position information in a power outlet to transmit it by PLC communication, a method of transmitting the physical position information using sound waves, a method of displaying a QR code (registered trademark), and the like. The physical position information may also be transmitted by utilization of units outside facilities such as satellite communication like global positioning system (GPS), wireless metropolitan area network (MAN) like Wi-MAX, or wireless wide area network (WAN) like 3G, 4G, LTE (registered trademark), or 5G.

The position information transmitted by position information transmitters 51 to 54 using the illumination light or another transmission method can be received by apparatus 41, 42, or 43.

Since position information transmitters 51 to 54 do not perform IP communication, position information transmitters 51 to 54 are not connected to factory network 10.

Position information transmitters 51 to 54 may be installed in facilities (for example, a factory) or may be installed outside the facilities.

1.2 Overall Configuration of Position Information Acquisition Terminal 20

FIG. 3 is a configuration diagram showing the configuration of position information acquisition terminal 20. In FIG. 3, position information acquisition terminal 20 includes position information manager 201, communicator 202, and storage 203. A computer including a processor (such as a central processing unit (CPU)), a memory, and the like executes programs, and thus position information acquisition terminal 20 can be realized.

Communicator 202 is a communication interface, and is connected to factory network 10 to communicate with apparatuses belonging to factory network 10 via factory network 10. Although the communication standard of the communication performed by communicator 202 is, for example, wired communication of IEEE 802.3 (Ethernet) or the like, the communication standard is not limited to this standard. The communication performed by communicator 202 may be another type of wired communication such as PLC or wireless LAN communication of IEEE 802.11 series (such as IEEE 802.11a, b, g, n, ac, and ax).

Position information manager 201 transmits a position information acquisition request via communicator 202, and receives a position information acquisition response. Then, position information manager 201 stores, in storage 203, a position information list for managing the physical position information of apparatuses obtained from the position information acquisition responses.

Storage 203 stores the position information list for managing the physical position information obtained by position information manager 201.

Figures 4, 5:
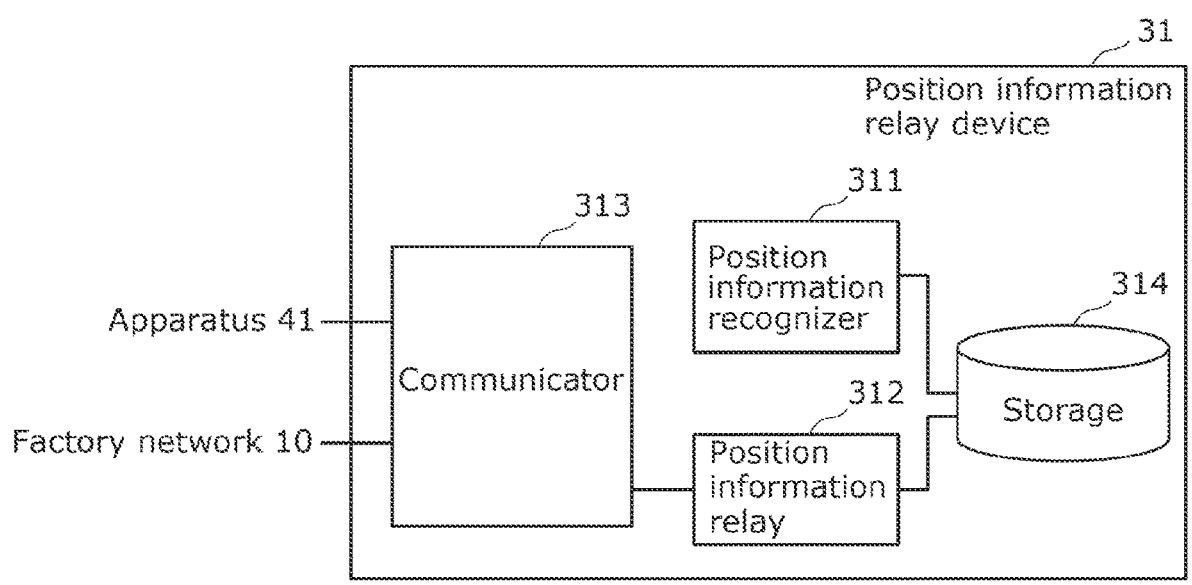
FIG. 4 is a diagram showing an example of a position information list in the embodiment.
FIG. 5 is a configuration diagram of a position information relay device in the embodiment.

FIG. 4 is a diagram showing an example of the position information list. In the position information list shown in FIG. 4, the physical position information associated with the IP addresses and the MAC addresses of apparatuses 41 to 44 is stored. In FIG. 4, for example, the IP address "192.168.1.41" and the MAC address "00:00:5E:00:53:41" are associated with the physical position information "1A".

If no position information is obtained, "none" is stored. Instead of "none", another character string such as "—" or "NULL" may be stored.

[1.3 Overall Configuration of Position Information Relay Device 31]

FIG. 5 is a configuration diagram of position information relay device 31. In FIG. 5, position information relay device 31 includes position information recognizer 311, position information relay 312, communicator 313, and storage 314. A computer including a processor (such as a CPU), a memory, and the like executes programs, and thus position information relay device 31 can be realized.

Position information recognizer 311 recognizes position information of apparatus 41. Position information recognizer 311 is also simply referred to as the recognizer.

Position information recognizer 311 includes a sensor which receives a signal including the physical position information transmitted by position information transmitter 51. Position information recognizer 311 recognizes the position information of apparatus 41 from the signal received from the sensor, and stores the position information in storage 314. Specifically, position information recognizer 311 receives light output by position information transmitter 51, converts the received light into an electric signal, demodulates it, and obtains the position information. Since visible light has a characteristic of extremely high directivity, position information recognizer 311 obtains only the position information of position information transmitter 51 located near position information relay device 31.

Communicator 313 is a communication interface, and is connected to factory network 10 and apparatus 41. Communicator 313 communicates with apparatuses belonging to factory network 10 via factory network 10. Although the communication standard of the communication performed by communicator 313 is, for example, wired communication of IEEE 802.3 (Ethernet) or the like, the communication standard is not limited to this standard. The communication performed by communicator 313 may be another type of wired communication such as PLC or wireless LAN communication of IEEE 802.11 series (such as IEEE 802.11a, b, g, n, ac, and ax).

Position information relay 312 transmits the position information to the network device. Position information relay 312 receives a communication packet transmitted by apparatus 41 to the network device, includes the position information in the received communication packet, and transmits the communication packet including the position information to the network device. Position information relay 312 is also simply referred to as the relay.

Specifically, position information relay 312 relays communication between factory network 10 and apparatus 41 via communicator 313. Position information relay 312 receives a communication packet toward apparatus 41 from an apparatus belonging to factory network 10, and transfers the communication packet to apparatus 41. Position information relay 312 receives the communication packet from apparatus 41, and transfers it to the apparatus of the destination of the communication packet.

Position information relay 312 determines whether the received communication packet is a position information acquisition request, when position information relay 312 determines that the received communication packet is a position information acquisition request from position information acquisition terminal 20, position information relay 312 stores, in storage 314, a position information conversion list produced by combining a "source MAC address" in the header of the position information acquisition request and a management flag obtained from a payload, and transfers the position information acquisition request to apparatus 41. The management flag is flag information in which the management flag is set on when the "source MAC address" is the address of a device that transmits the position information acquisition request and the management flag is set off when the "source MAC address" is not the address of the device.

When position information relay 312 receives a position information acquisition response from apparatus 41, position information relay 312 includes, in the position information acquisition response, the physical position information stored in storage 314, and transfers the position information acquisition response to position information acquisition terminal 20.

More specifically, position information relay 312 identifies a command of a network protocol in which the communication packet received from apparatus 41 is used, and determines whether the identified command of the network protocol is a predetermined command. Then, when position information relay 312 determines that the identified command of the network protocol is the predetermined command, position information relay 312 includes the position information in a predetermined field included in the communication packet.

Position information relay 312 receives, as the communication packet, a response packet which is transmitted by apparatus 41 to position information acquisition terminal 20 as a response to the request packet of the network protocol, and which includes a response command determined by the network protocol.

When position information relay 312 receives the request packet of the network protocol, position information relay 312 determines whether a predetermined code is included in the predetermined field within the received request packet. Then, when position information relay 312 determines that the predetermined code is included in the received request packet, position information relay 312 receives, as the communication packet, the response packet in which apparatus 41 set as the destination of the received request packet is set as a source, includes the position information in the received communication packet, and transmits the communication packet including the position information to the network device.

Storage 314 stores the position information received by position information recognizer 311. In storage 314, the position information conversion list produced by position information relay 312 is stored.

FIG. 6 shows an example of the position information conversion list. In the position information conversion list shown in FIG. 6, the "source MAC address" in the header of the position information acquisition request and the management flag obtained from the payload are registered.

Each of position information relay devices 32 and 33 has the same configuration as position information relay device 31. However, position information relay devices 32 and 33 differ from position information relay device 31 in that position information relay devices 32 and 33 are respectively connected to apparatuses 42 and 43 instead of apparatus 41.

[1.4 Operation of Position Information Acquisition System]

Figure 7:
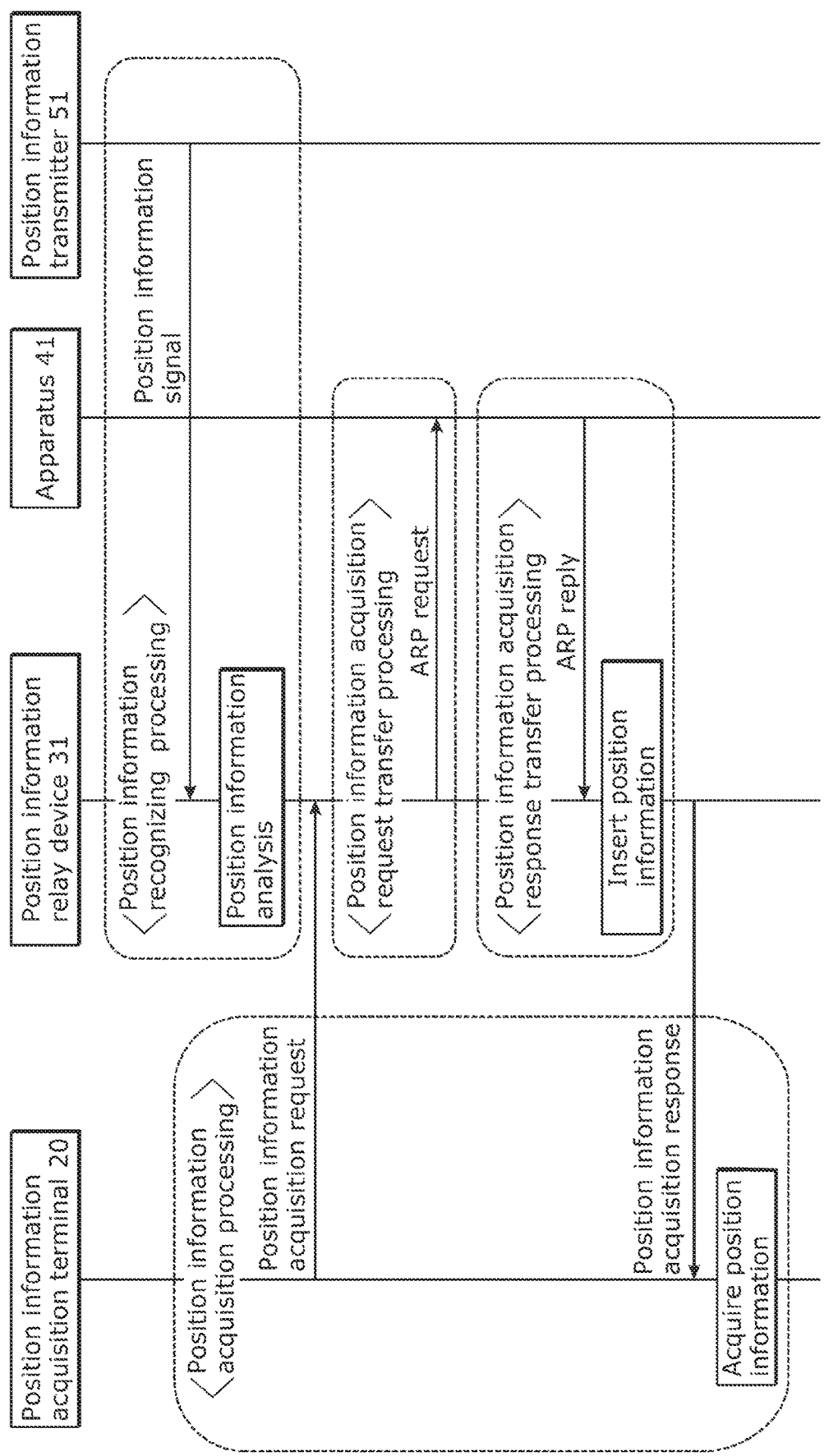
FIG. 7 is a sequence diagram of the position information acquisition system in the embodiment.

FIG. 7 is a diagram showing the processing sequence of the position information acquisition system according to the present embodiment.

The position information acquisition system performs at least four processing steps, that is, position information recognizing processing, position information acquisition request transfer processing, position information acquisition response transfer processing, and position information acquisition processing.

The position information recognizing processing is processing which recognizes and stores the physical position information of apparatus 41 to which position information relay device 31 is connected. The position information recognizing processing is performed periodically, and thus position information relay device 31 can recognize the latest physical position of apparatus 41. The position information recognizing processing may be performed when the physical position information of apparatus 41 is needed.

The position information acquisition processing is processing in which position information acquisition terminal 20 acquires the physical position of apparatus 41, 42, 43, or 44 in factory network 10. Specifically, position information acquisition terminal 20 transmits a position information acquisition request in which the IP address of an apparatus (also referred to as the target apparatus) whose physical position information is desired to be acquired is set, receives a position information acquisition response including the physical position information of the apparatus corresponding to the IP address, and thereby acquires the physical position information of the target apparatus.

In the present embodiment, in the position information acquisition processing, as the position information acquisition request and the position information acquisition response, the communication packet of an address resolution protocol (ARP) which is a general network protocol is utilized. In this case, a request command and a response command which are determined by the network protocol are an ARP request and an ARP reply, respectively.

Figure 8:
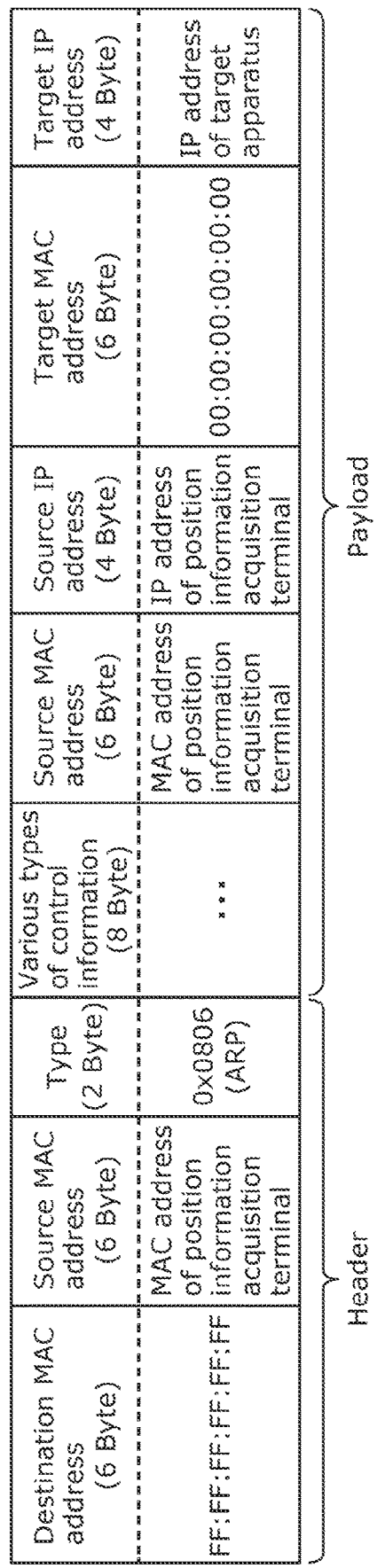
FIG. 8 is a diagram showing a packet format of an ARP request in the embodiment.
Figure 9:
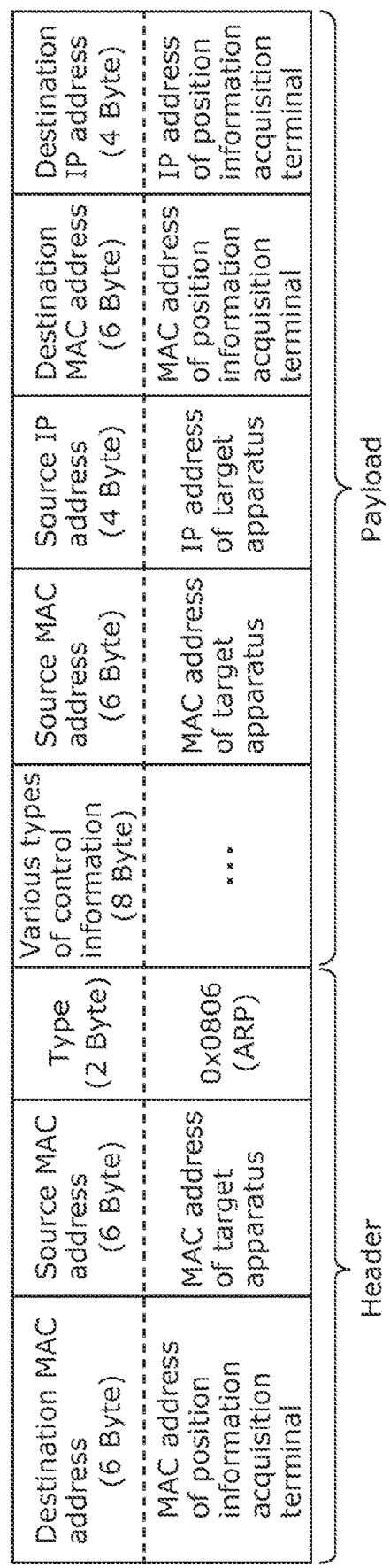
FIG. 9 is a diagram showing a packet format of an ARP reply in the embodiment.

Here, FIG. 8 is a diagram showing the packet format of an ARP request packet (also referred to as the "ARP request"). FIG. 9 is a diagram showing the packet format of an ARP reply packet (also referred to as the "ARP reply").

The ARP is a network protocol which is used by an apparatus (also referred to as the ARP request source apparatus) that performs address resolution to acquire the MAC address of an apparatus (also referred to as the target apparatus) corresponding to a target IP address. In the communication of the ARP, the ARP request source apparatus first sets the target IP address to the payload of the ARP request to broadcast the target IP address to all apparatuses on factory network 10. Among the apparatuses which receive the ARP request, the apparatus corresponding to the target IP address returns, to the ARP request source apparatus, the ARP reply in which the MAC address thereof is set as the "source MAC address" in the payload. The ARP request source apparatus acquires the "source MAC address" in the payload of the ARP reply as the MAC address of the target apparatus.

The position information acquisition system of the present embodiment uses an ARP request format as the position information acquisition request, and uses an ARP reply format as the position information acquisition response.

When apparatus 41 receives the ARP request transmitted by position information acquisition terminal 20, apparatus 41 transmits the ARP reply to position information acquisition terminal 20 as a response to the received ARP request.

A description will be given with reference back to FIG. 7. The position information acquisition request transfer processing and the position information acquisition response transfer processing are processing in which position information acquisition terminal 20 acquires the physical position information of apparatus 41.

Specifically, position information relay device 31 interrupts the communication of the position information acquisition request and the position information acquisition response serving as ARP communication performed between position information acquisition terminal 20 and apparatus 41, replaces the "source MAC address" in the payload of the ARP reply from the MAC address of apparatus 41 to the physical position information of apparatus 41, and transmits the position information acquisition response to position information acquisition terminal 20. In this way, position information acquisition terminal 20 acquires the physical position information of apparatus 41.

Since the function to perform the ARP communication is always installed in an apparatus which performs network communication, the ARP is utilized, and thus it is possible to realize the acquisition of the physical position information without an apparatus installed in the factory being replaced and without a program being installed.

Although in the present embodiment, the ARP is utilized, another general network protocol such as Ping (ICMP Eco) may be utilized.

The details of the processing will be described below with reference to drawings.

[1.4.1 Position Information Acquisition Processing]

Figure 10:
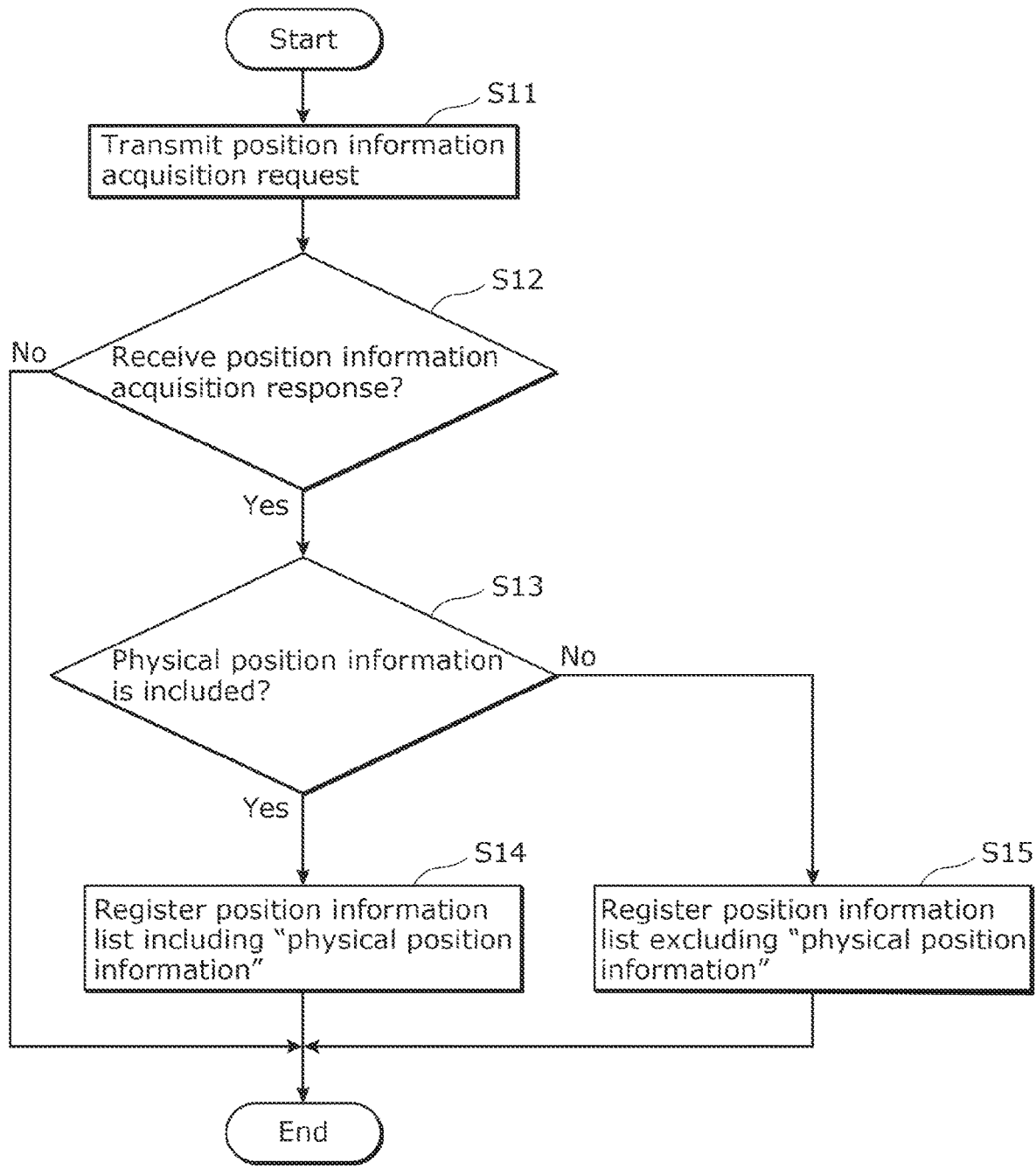
FIG. 10 is a flowchart of position information acquisition processing in the embodiment.
Figure 11:
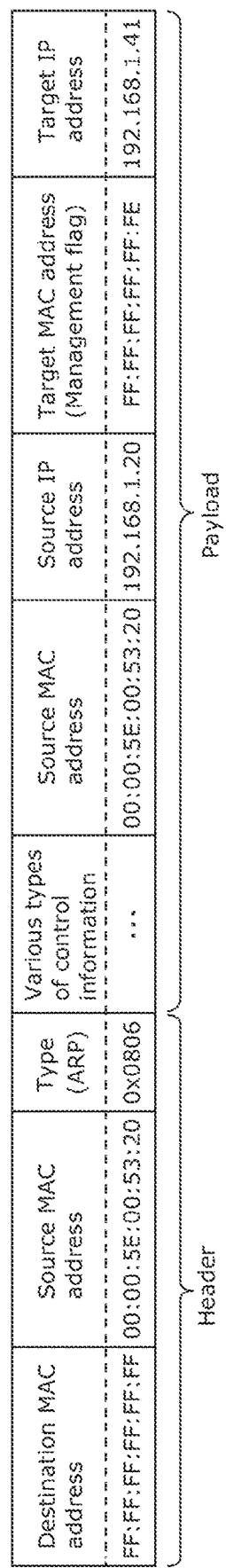
FIG. 11 is a diagram showing an example of a position information acquisition request packet in the embodiment.
Figure 12:
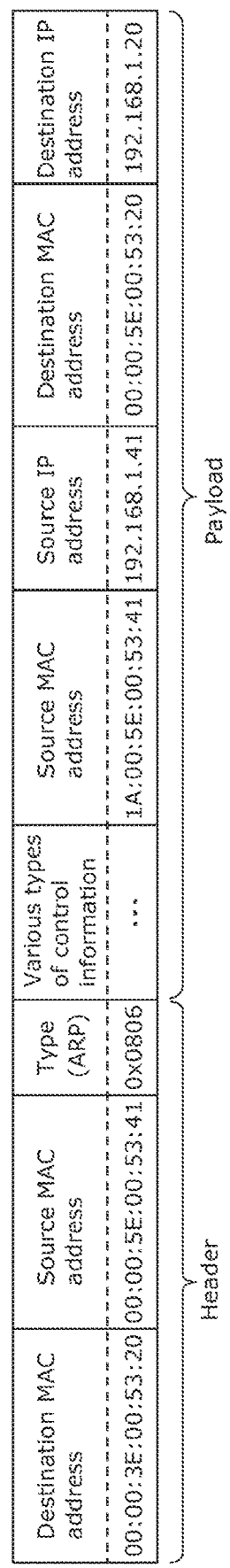
FIG. 12 is a diagram showing an example of a position information acquisition response packet in the embodiment.

FIG. 10 is a flowchart of the position information acquisition processing. FIG. 11 is a diagram showing an example of a position information acquisition request packet. FIG. 12 is a diagram showing an example of a position information acquisition response packet.

In step S11, position information manager 201 sets, as a "target IP address", the IP address of a target apparatus whose physical position information is desired to be acquired, and a position information acquisition request packet (also referred to as the "position information acquisition request") in which the management flag is set on is produced and is fed out to factory network 10 via communicator 202.

FIG. 11 is a diagram showing an example of the position information acquisition request packet in the embodiment.

As shown in FIG. 11, in the present embodiment, as an example, a "target MAC address" in the payload of the ARP request serving as the position information acquisition request packet is used as information indicating the management flag. In a normal ARP request, "00:00:00:00:00:00" is set for the "target MAC address" or "FF:FF:FF:FF:FF:FF" is set for installation. Hence, the target MAC address of "00:00:00:00:00:00" or "FF:FF:FF:FF:FF:FF" is assumed to indicate that the management flag is off. Then, information other than what is described above which is set to the field of the target MAC address is assumed to indicate that the management flag is on.

For example, the information indicating that the management flag is on is "FF:FF:FF:FF:FF:FF" (see FIG. 11), and is also referred to as a management code or the predetermined code. Position information manager 201 sets the management code to the "target MAC address" in the payload of the ARP request, and thus the management flag of the ARP request is set on. Position information manager 201 sets "00:00:00:00:00:00" to the "target MAC address" in the payload of the ARP request, and thus the management flag of the ARP request is set off.

As the management code indicating that the management flag is on, instead of "FF:FF:FF:FF:FF:FF", another code may be utilized.

In step S12, position information manager 201 waits to receive a position information acquisition response packet (also referred to as the "position information acquisition response"). Position information manager 201 determines whether the position information acquisition response packet has been received by a response reception timeout. Then, when the position information acquisition response packet has been received by the response reception timeout (yes in step S12), the processing proceeds to step S13, and when this is not the case (no in step S12), a series of processing steps shown in FIG. 10 is completed.

In step S13, position information manager 201 determines whether physical position information is included in the position information acquisition response packet. Specifically, when the "source MAC address" in the header of the position information acquisition response packet is different from the "source MAC address" in the payload, position information manager 201 determines that the physical position information is included in the position information acquisition response packet, and when the "source MAC address" in the header of the position information acquisition response packet is the same as the "source MAC address" in the payload, position information manager 201 determines that the position information is not included in the position information acquisition response packet. When position information manager 201 determines that the physical position information is included in the position information acquisition response packet (yes in step S13), the processing proceeds to step S14, and when this is not the case (no in step S13), the processing proceeds to step S15.

FIG. 12 is a diagram showing an example of the position information acquisition response packet in the present embodiment.

In FIG. 12, the "source MAC address" in the header of the position information acquisition response packet is different from the "source MAC address" in the payload. Specifically, "00:00:5E:00:53:41" which is the "source MAC address" in the header of the position information acquisition response packet is the MAC address of apparatus 41, and in "1A:00:5E:00:53:41" included in the field of the "source MAC address" in the payload, the first octet of the MAC address of apparatus 41 is changed to "1A". This is because "1A" serving as the physical position information of apparatus 41 is stored in the first octet of the "source MAC address" in the payload by position information relay 312.

In step S14, position information manager 201 combines the "source MAC address" in the header of the position information acquisition response packet and the "position information" and the "source IP address" in the payload, and registers them in the position information list of storage 203.

The position information list registered from the position information acquisition response packet in FIG. 12 corresponds to the first row in FIG. 4.

In the factory, there is an apparatus such as apparatus 44 to which the position information relay device is not connected. In such an apparatus, the physical position information is not included in the position information acquisition response packet, and thus the physical position information is not included in the position information acquisition response packet, with the result that the MAC address of the apparatus is kept stored in the "source MAC address" in the payload. In other words, the "source MAC address" in the header of the position information acquisition response packet is the same as the "source MAC address" in the payload. In this case, the determination result in step S13 is no, and thus the processing proceeds to step S15.

In step S15, position information manager 201 combines the "source MAC address" in the header of the position information acquisition response packet and the "source IP address" in the payload, registers them in the position information list of storage 203, and registers "none" as the physical position information. This position information list registered from the position information acquisition response packet corresponds to the fourth row in FIG. 4.

Timing at which the position information acquisition request packet is transmitted by position information manager 201 may be timing at which a user's instruction is received from an instruction receiver (not shown) in position information acquisition terminal 20 or may be periodic timing.

[1.4.2 Position Information Recognizing Processing]

Figure 13:
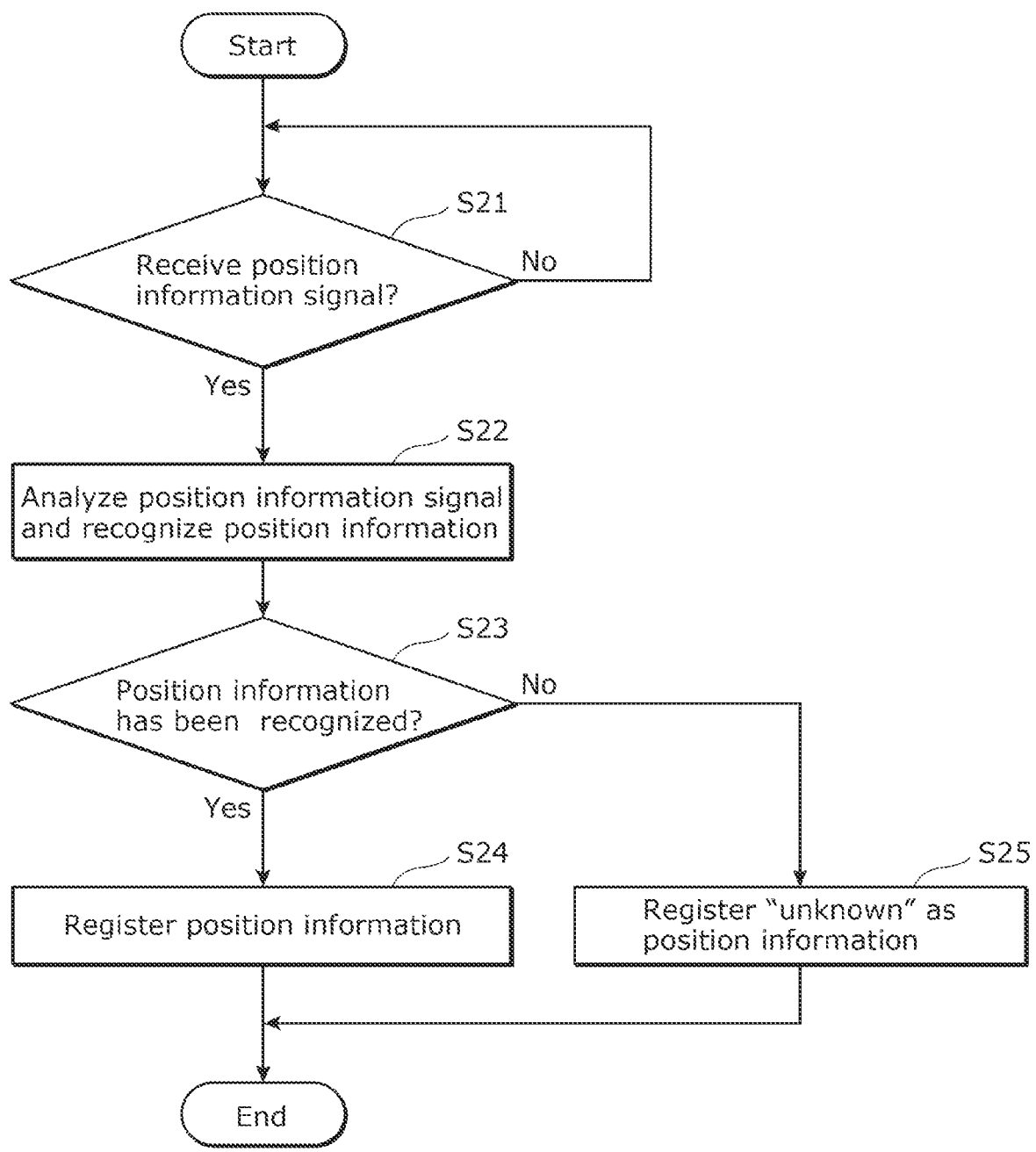
FIG. 13 is a flowchart of position information recognizing processing in the embodiment.

FIG. 13 is a flowchart showing the position information recognizing processing performed by position information recognizer 311.

In the present embodiment, a case will be described where an illumination apparatus is used as position information transmitter 51 and position information recognizer 311 performs the position information recognizing processing using visible light communication by illumination light. Position information transmitter 51 modulates and transmits illumination light with a binary signal obtained by binarizing the position information (that is, "1A") which indicates a previously input physical position. Position information recognizer 311 includes a light receiver for illumination.

In step S21, position information recognizer 311 determines whether a position information signal is received from position information transmitter 51 via the light receiver. When position information recognizer 311 determines that the position information signal is received (yes in step S21), the processing proceeds to step S22, and when this is not the case (no in step S21), step S21 is performed again. In other words, position information recognizer 311 waits in step S21 until receiving the position information signal.

In step S22, position information recognizer 311 analyzes position information included in the position information signal. Specifically, position information recognizer 311 demodulates the illumination light into a binary signal, and further demodulates it into a position information signal to acquire the position information.

In step S23, position information recognizer 311 determines whether the position information has been recognized. When the position information has been recognized (yes in step S23), the processing proceeds to step S24, and when this is not the case (no in step S23), the processing proceeds to step S25.

In step S24, position information recognizer 311 registers "1A" in storage 314 as the position information.

In step S25, position information recognizer 311 registers data indicating "unknown" as the position information. The position information recognizing processing is periodically performed, and thus even when the position information is changed, it is possible to follow the latest information.

Although "unknown" is stored as the data indicating that the position information is unknown, a character string such as "—" or NULL may be stored.

Although the example is shown where position information transmitter 51 uses the binary signal obtained by binarizing the position information to modulate the illumination light, another method may be used. For example, position information transmitter 51 may set the number of flashes of the illumination light or the lighting time thereof based on the position information, use the number of flashes of the illumination light or the lighting time to cause position information relay device 33 to recognize the position information. Position information transmitter 51 may notify the position information along a predetermined lighting pattern or flashing pattern, for example, by the following method; position information relay device 33 is caused to recognize the distinction of the zone by the number of flashes in such a manner that when the illumination light flashes once every 10 seconds, "zone 1" is indicated or when the illumination light flashes twice every 10 seconds, "zone 2" is indicated, and position information relay device 33 is caused to recognize the zone by the lighting time in such a manner that when the lighting time of the illumination is 2 seconds, "zone A" is indicated or when the lighting time is 5 seconds, "zone B" is indicated. The number of flashes or the lighting time is an example, and the present embodiment is not limited to this example.

When position information transmitter 51 uses the number of flashes or the lighting time to notify the position information, position information recognizer 311 includes the light receiver serving as a sensor for receiving the illumination light, and recognizes the position information indicating the presence of the apparatus from an interval between flashes of the illumination received by the light receiver, the lighting time, or the like. For example, when position information transmitter 51 flashes twice in 10 seconds with the lighting time of 2 seconds, position information recognizer 311 recognizes the position information such that the position information indicates "block A of zone 2", that is, "2A".

[1.4.3 Position Information Acquisition Request Transfer Processing]

Figure 14:
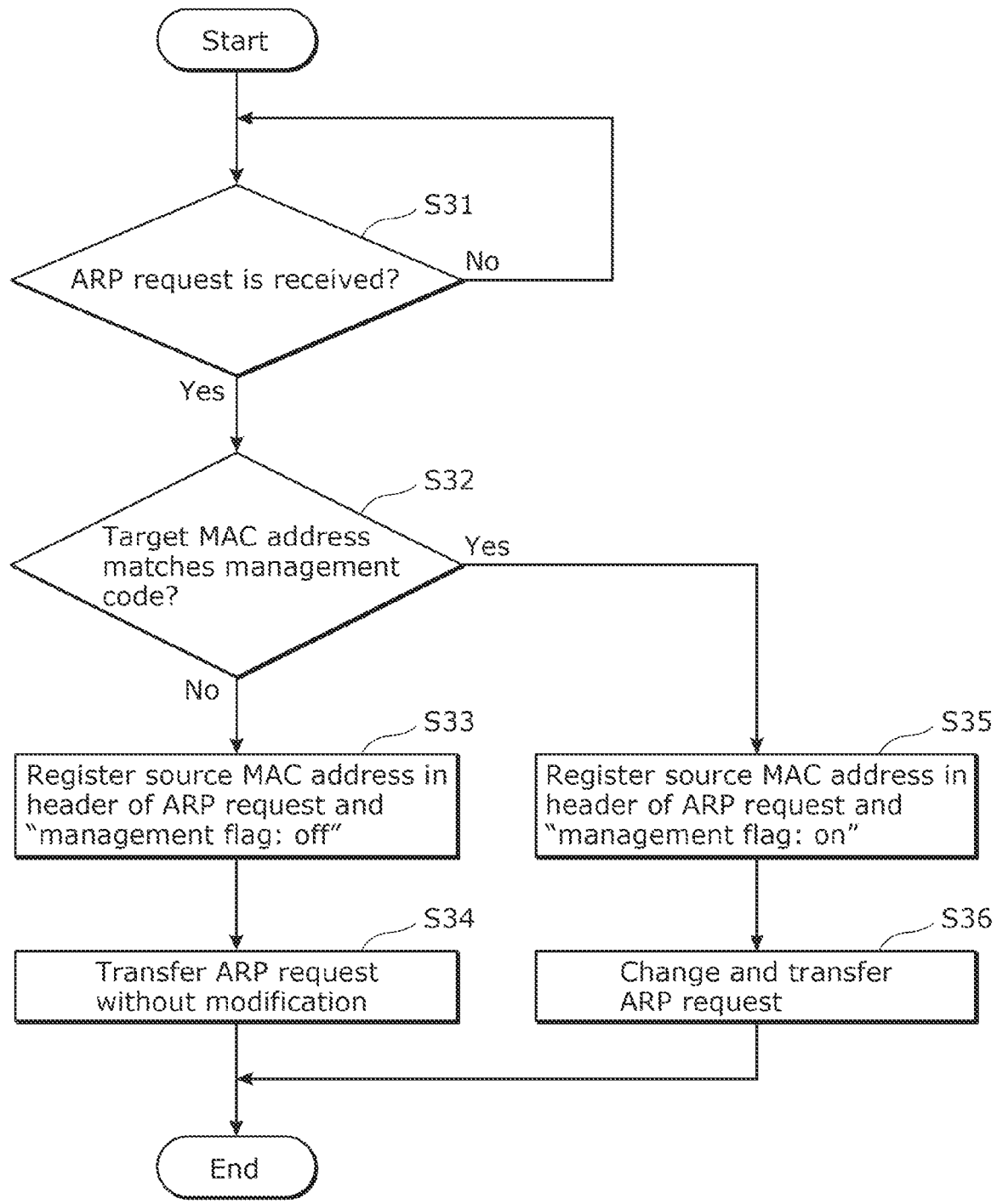
FIG. 14 is a flowchart of position information acquisition request transfer processing in the embodiment.

FIG. 14 is a flowchart showing the position information acquisition request transfer processing of position information relay 312.

In step S31, position information relay 312 determines whether the ARP request has been received. When position information relay 312 determines that the ARP request has been received (yes in step S31), the processing proceeds to step S32, and when this is not the case (no in step S31), step S31 is performed again. In other words, position information relay 312 waits in step S31 until the ARP request is received.

In step S32, position information relay 312 determines whether the target MAC address in the payload of the packet of the APR request received in step S31 matches the management code (in other words, whether the ARP request indicates that the management flag is on). When position information relay 312 determines that the target MAC address does not match the management code (in other words, when the ARP request indicates that the management flag is off) (no in step S32), the processing proceeds to step S33. When position information relay 312 determines that the target MAC address matches the management code (in other words, when the ARP request indicates that the management flag is on) (yes in step S32), the processing proceeds to step S35.

In step S33, position information relay 312 combines information indicating the "source MAC address" in the header of the packet of the ARP request and information indicating "management flag: off", and registers them in the position information conversion list stored in storage 314. This is because the ARP request received in step S31 is the ARP request from an apparatus other than position information acquisition terminal 20.

In step S34, position information relay 312 transfers the packet of the ARP request received in step S31 to apparatus 41 without modification.

In step S35, position information relay 312 combines information indicating the "source MAC address" in the header of the packet of the ARP request and information indicating "management flag: on", and registers them in the position information conversion list stored in storage 314. This is because the ARP request received in step S31 is the ARP request from position information acquisition terminal 20.

In step S36, position information relay 312 turns the management flag of the ARP request off, and transfers the management flag to apparatus 41. Specifically, in the case of FIG. 11, position information relay 312 changes "FF:FF:FF:FF:FF:FE" which is the target MAC address used as the management code to "00:00:00:00:00:00", and thereby transfers it to apparatus 41 as the ARP request having the format of a normal ARP request packet.

[1.4.4 Operation in Position Information Acquisition Response Transfer Processing]

Figure 15:
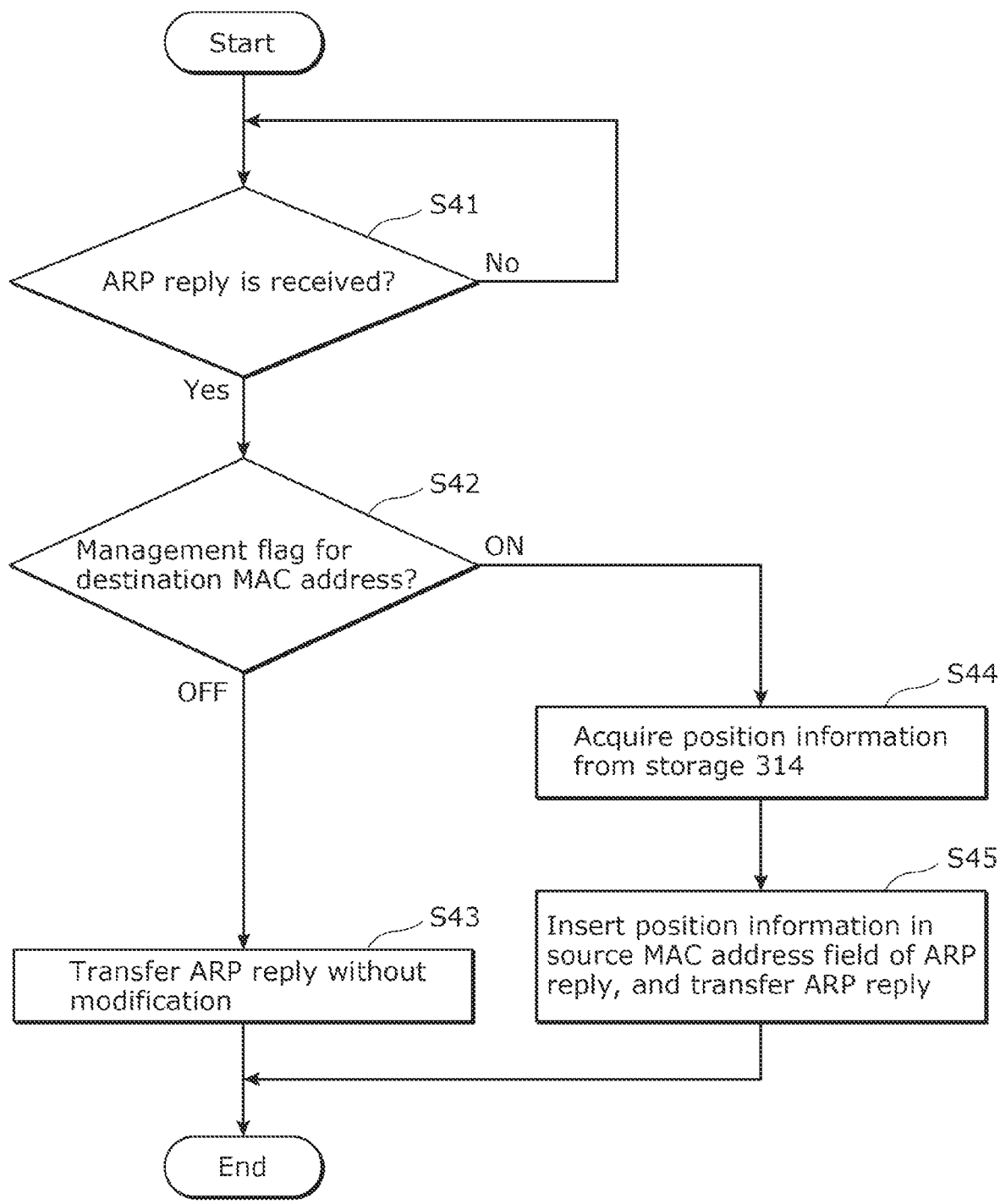
FIG. 15 is a flowchart of position information acquisition response transfer processing in the embodiment.

FIG. 15 is a flowchart showing the position information acquisition response transfer processing of position information relay 312.

In step S41, position information relay 312 determines whether the ARP reply has been received. When position information relay 312 determines that the ARP reply has been received (yes in step S41), the processing proceeds to step S42, and when this is not the case (no in step S41), step S41 is performed again. In other words, position information relay 312 waits in step S41 until the ARP reply is received.

In step S42, position information relay 312 searches the position information conversion list stored in storage 314 for "destination MAC address" in the header of the ARP reply packet received in step S41, and determines whether the management flag of the "destination MAC address" is off or on. When the management flag is off ("off" in step S42), the processing proceeds to step S43, and when the management flag is on ("on" in step S42), the processing proceeds to step S44.

In step S43, position information relay 312 transfers the ARP reply packet to the apparatus of the destination without modification. This is because the ARP reply received in step S41 is an ARP reply in normal ARP communication.

In step S44, position information relay 312 acquires the physical position information of apparatus 41 stored in storage 314. This is because the ARP reply received in step S41 is not an ARP reply in normal ARP communication but an ARP reply functioning as a response to the position information acquisition request which is transmitted by position information acquisition terminal 20 to acquire the position information of apparatus 41, and the request source is position information acquisition terminal 20.

In step S45, position information relay 312 includes, in the field of the "source MAC address" of the ARP reply packet, the physical position information of apparatus 41 (for example, rewrites part or all of the field of the "source MAC address" into the physical position information of apparatus 41), thereby produces a position information acquisition response, and transfers it to position information acquisition terminal 20. It is likely that "unknown" is stored as the physical position information, and in this case, position information relay 312 rewrites part or all of the field of the "source MAC address" of the ARP reply packet into information indicating "unknown", thereby produces a position information acquisition response, and transfers it.

Each of position information relay devices 32 and 33 performs the same processing as position information relay device 31, and is operated independently of position information relay device 31.

[1.4.5 Sequence Example (1) of Position Information Acquisition System]

Figure 16:
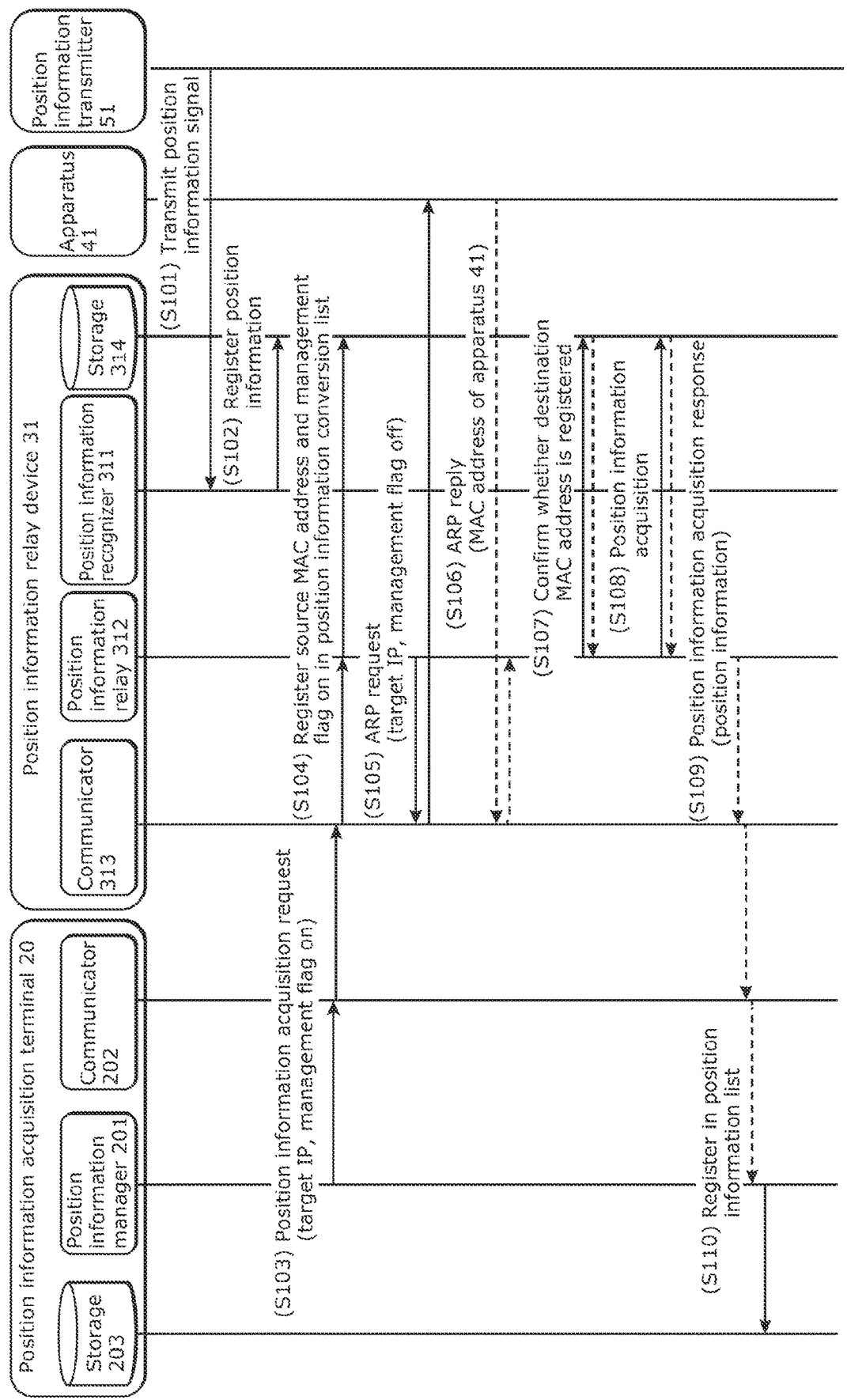
FIG. 16 is a diagram showing sequence example (1) of a position information system in the embodiment.

FIG. 16 is sequence example (1) of the position information acquisition system in the present embodiment.

The sequence of the entire position information acquisition system when position information acquisition terminal 20 acquires the position information of apparatus 41 connected to position information relay device 31 will be described with reference to FIG. 16.

In step S101, position information relay device 31 previously performs the position information recognizing processing. Specifically, position information recognizer 311 receives the position information signal from position information transmitter 51.

In step S102, position information relay device 31 extracts the position information from the position information signal received in step S101, and registers "1A" serving as the position information in storage 314.

In step S103, position information manager 201 of position information acquisition terminal 20 sets the IP address of apparatus 41 as the target IP address, uses, as the position information acquisition request packet, the ARP request packet in which the management flag is set on, and broadcasts it via communicator 202.

In step S104, position information relay 312 of position information relay device 31 which has received the ARP request via communicator 313 determines, based on the fact that the management flag of the ARP request is on, that the ARP request is the position information acquisition request transmitted from position information acquisition terminal 20, combines information indicating the "source MAC address" in the header of the position information acquisition request packet (specifically, "00:00:5E:00:53:20" which is the MAC address of position information acquisition terminal 20) and information indicating "management flag: on", and registers them in the position information conversion list stored in storage 314.

In step S105, position information relay 312 turns the management flag of the position information acquisition request packet off, and transfers the management flag to apparatus 41 via communicator 313.

In step S106, position information relay 312 receives the ARP reply packet from apparatus 41 via communicator 313.

In step S107, position information relay 312 uses the "destination MAC address" in the header of the ARP reply packet received in step S106 (specifically, "00:00:5E:00:53:20" which is the MAC address of position information acquisition terminal 20) as a key, searches the position information conversion list stored in storage 314, and acquires the management flag associated with the destination MAC address. Here, position information relay 312 acquires information that the management flag is on.

In step S108, position information relay 312 acquires the position information of apparatus 41 stored in storage 314.

In step S109, position information relay 312 rewrites the first octet of the "source MAC address" in the ARP reply packet into "1A" which is the position information, produces the position information acquisition response, and transfers it to position information acquisition terminal 20 via communicator 313.

In step S110, position information manager 201 of position information acquisition terminal 20 which has received the position information acquisition response via communicator 202 determines, based on the fact that the "source MAC address" in the header of the ARP reply packet is different from the "source MAC address" in the payload, that the position information is included in the ARP reply packet, combines three pieces of information, that is, the "source MAC address" in the header of the position information acquisition response, "1A" serving as the "position information" in the payload, and the "source IP address", and registers them in the position information list stored in storage 203.

[1.4.6 Sequence Example (2) of Position Information Acquisition System]

Figure 17:
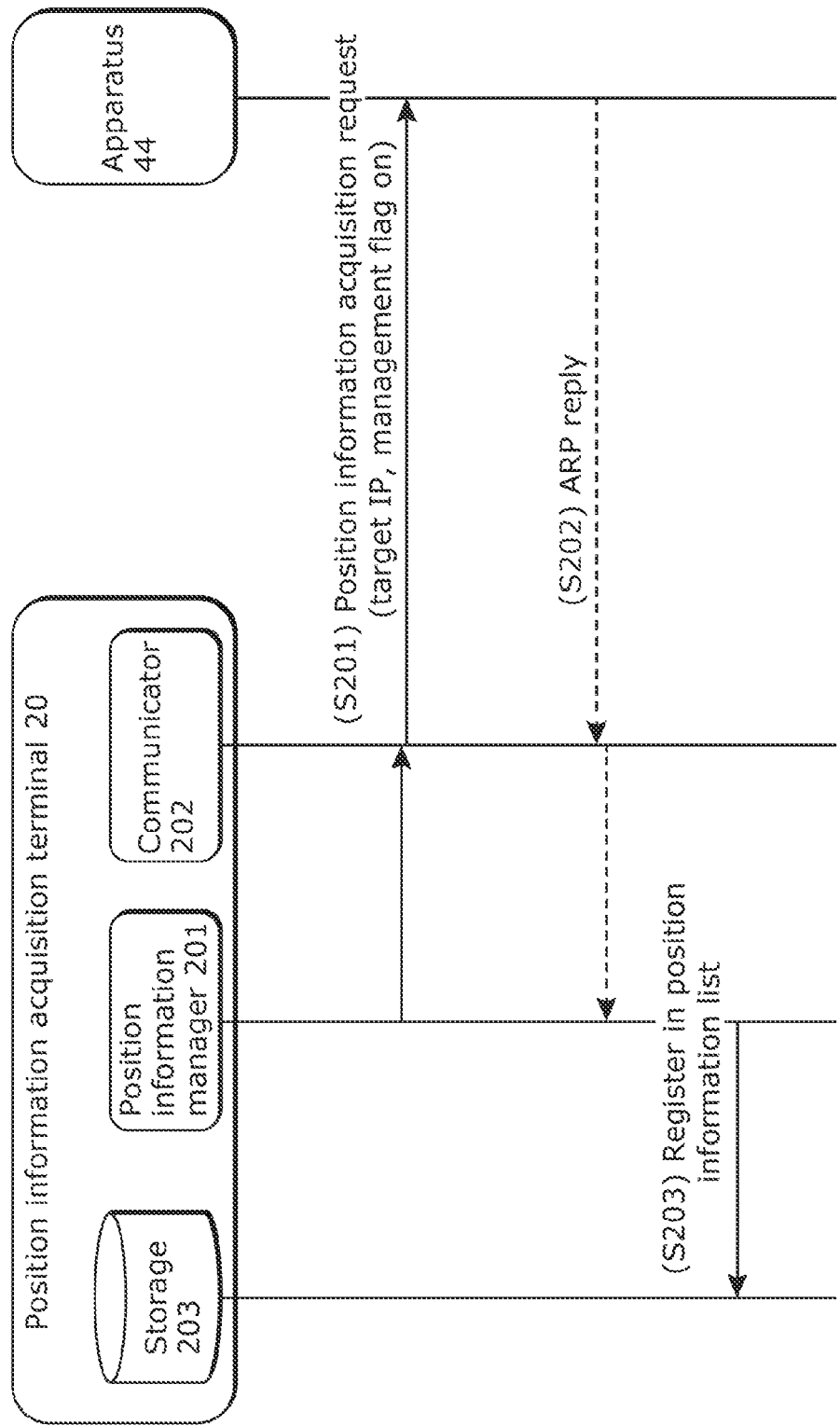
FIG. 17 is a diagram showing sequence example (2) of a position information system in the embodiment.

FIG. 17 is sequence example (2) of the position information acquisition system in the present embodiment.

The sequence of the entire position information acquisition system when position information acquisition terminal 20 fails to acquire the physical position information of apparatus 44 which is not connected to the position information relay device will be described below with reference to FIG. 17.

In step S201, position information manager 201 of position information acquisition terminal 20 sets the IP address of apparatus 44 as the target IP address, uses, as the position information acquisition request, the ARP request in which the management flag is set on, and broadcasts it via communicator 202.

In step S202, apparatus 44 which has received the ARP request packet transmits, based on the fact that the target IP address in the ARP request matches the IP address of apparatus 44, the ARP reply including the MAC address of apparatus 44 to position information acquisition terminal 20.

In step S203, position information manager 201 which has received the ARP request packet from apparatus 41 via communicator 202 determines, based on the fact that the "source MAC address" in the header of the ARP reply packet matches the "source MAC address" in the payload, that the ARP reply packet does not include the physical position information, and registers, in storage 203, the "source MAC address" in the header of the position information acquisition response, the "source IP address" in the payload, and "none" serving as the physical position information.

As described above, the transmission of the position information acquisition request using the ARP request packet in the present embodiment does not adversely affect the ARP communication of an apparatus which is not connected to the position information relay device.

[1.4.7 Sequence Example (3) of Position Information Acquisition System]

Figure 18:
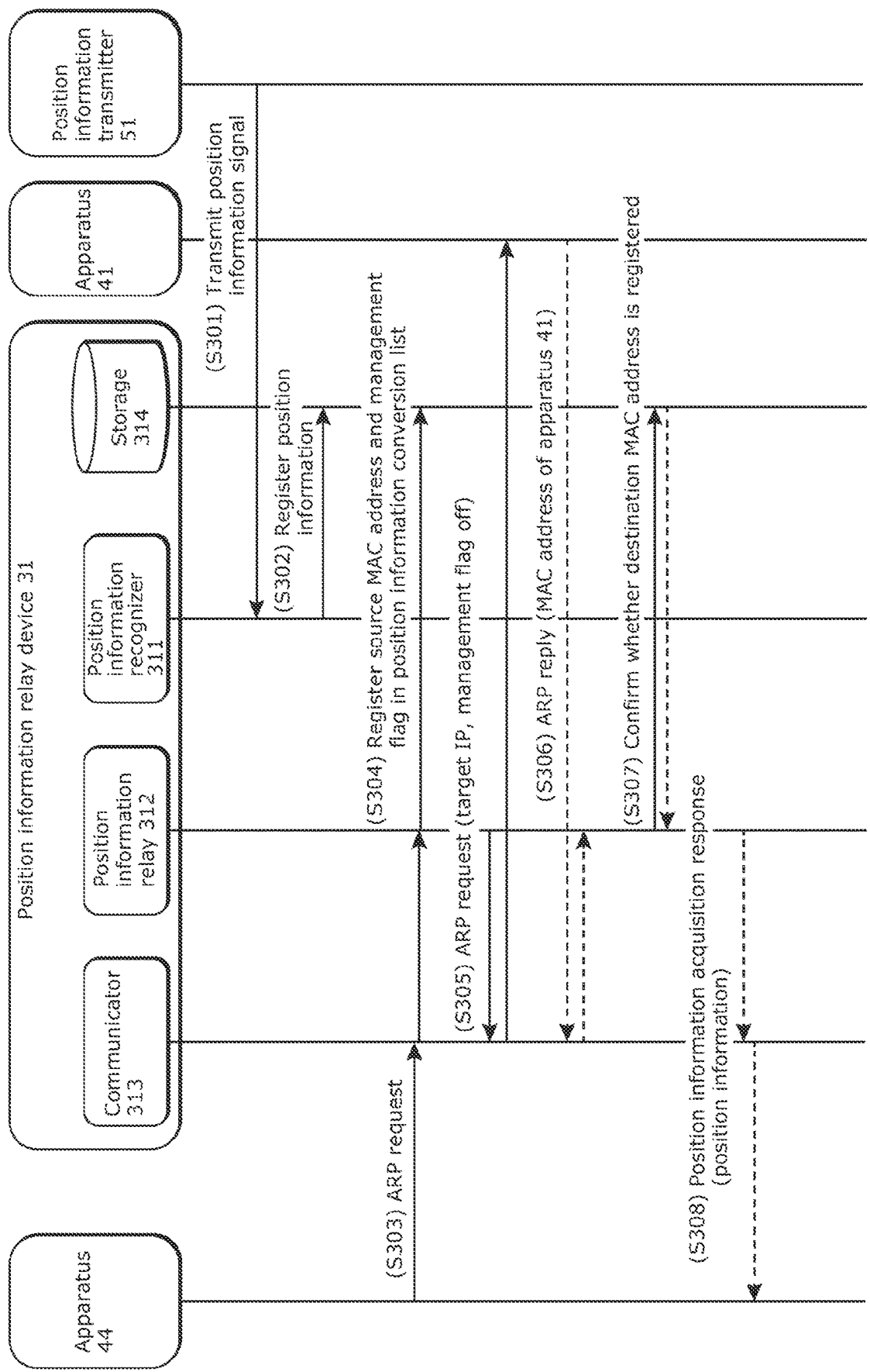
FIG. 18 is a diagram showing sequence example (3) of a position information system in the embodiment.

FIG. 18 is sequence example (3) of the position information acquisition system in the present embodiment.

The sequence example of the entire position information acquisition system when apparatus 44 performs the ARP communication with apparatus 41 connected to position information relay device 31 will be described with reference to FIG. 18.

In steps S301 and S302, position information relay device 31 performs the position information recognizing processing. Specifically, position information recognizer 311 receives the position information signal from position information transmitter 51 (step S301), extracts the position information from the received position information signal, and registers "1A" serving as the position information in storage 314 (step S302).

In step S303, apparatus 44 broadcasts the ARP request packet in which the IP address of apparatus 41 is set as the targe IP address.

In step S304, position information relay 312 of position information relay device 31 which has received the ARP request via communicator 313 determines, based on the fact that the management flag of the ARP request is off, that the ARP request described above is the ARP request transmitted from an apparatus other than position information acquisition terminal 20, combines the "source MAC address" in the header of the ARP request (specifically, "00:00:5E:00:53:44" which is the MAC address of apparatus 44) and information indicating "management flag: off", and registers them in the position information conversion list stored in storage 314.

In step S305, position information relay 312 transfers the ARP reply packet to apparatus 41 via communicator 313 without modification.

In step S306, position information relay 312 receives the ARP reply packet from apparatus 41 via communicator 313.

In step S307, position information relay 312 uses the "destination MAC address" in the header of the ARP reply packet received in step S306 (specifically, "00:00:5E:00:53:44" which is the MAC address of apparatus 44) as a key, searches the position information conversion list stored in storage 314, and acquires the management flag associated with the destination MAC address. Here, position information relay 312 acquires information that the management flag is off.

In step S308, position information relay 312 transfers the ARP reply packet to apparatus 44 via communicator 313 without modification.

As described above, the transmission of the position information acquisition request using the ARP request packet in the present embodiment does not adversely affect the ARP communication of normal apparatuses.

As described above, the position information relay device in the present embodiment contributes to appropriate recognizing of the position information of the apparatus which is connected.

Although in the present embodiment, the position information acquisition system targets factory network 10, this is an aspect of the position information acquisition system, and the target is not limited to the factory network. For example, a plurality of apparatuses may be connected to a network such as a building network, a home network, or a vehicle network such that the physical position information of the apparatuses can be acquired via the network, and the position information acquisition system may target another network field.

In the embodiment described above, constituent elements may be formed by dedicated hardware or may be realized by executing a software program suitable for each of the constituent elements. Each of the constituent elements may be realized in such a way that a program executor such as a CPU or a processor reads and executes a software program recorded in a recording medium such as a hard disk or a semiconductor memory. Here, software which realizes a content management system or the like in the embodiment described above is a program as described below.

Specifically, this program is a program which causes a computer to execute a position information relay method performed by a position information relay device interposed between the network device and an apparatus, and the position information relay method includes: recognizing position information of the apparatus; receiving a communication packet transmitted by the apparatus to the network device; including the position information in the communication packet received; and transmitting the communication packet including the position information to the network device.

Although the information processing method and the like according to one or a plurality of aspects have been described above based on the embodiment, the present disclosure is not limited to this embodiment. Embodiments obtained by performing various types of variations conceived by a person skilled in the art on the present embodiment and embodiments established by combining constituent elements in different embodiments may be included in the scope of the one or the plurality of aspects as long as they do not depart from the spirit of the present disclosure.

Industrial Applicability

The present disclosure can be applied to industries which establish networks that include terminals having IP addresses.

The invention claimed is:

1. A position information relay device interposed between a network device and an apparatus, the position information relay device comprising:
a processor configured to implement:
a recognizer that recognizes position information of the apparatus; and
a relay that: receives a communication packet transmitted by the apparatus to the network device; includes the position information in the communication packet received and transmits the communication packet including the position information to the network device,
wherein the relay:
identifies a command of a network protocol in which the communication packet received is used,
determines whether the command of the network protocol identified is a predetermined command, and
includes the position information in a predetermined field included in the communication packet when determining that the command of the network protocol identified is the predetermined command.

2. The position information relay device according to claim 1,
wherein the position information relay device is set within a predetermined distance from the apparatus, and
the recognizer includes a sensor that acquires position information of the position information relay device, and
recognizes, as the position information of the apparatus, the position information of the position information relay device acquired by the sensor.

3. The position information relay device according to claim 1, wherein the processor is further configured to connect the apparatus to a management device via one or more network devices each being the network device, transmit, from the management device to the apparatus, a request packet including a request command determined by a network protocol, receive the request packet by the relay and transmit the request packet from the relay to the apparatus, and receive, by the relay as the communication packet, a response packet transmitted by the apparatus to the management device as a response to the request packet, the response packet including a response command determined by the network protocol.

4. The position information relay device according to claim 3, wherein the relay determines whether a predetermined code is included in a predetermined field within the request packet received when receiving the request packet, receives, as the communication packet, the response packet in which the apparatus set as a destination of the request packet received is set as a source when determining that the predetermined code is included in the request packet received, includes the position information in the communication packet received, and transmits the communication packet including the position information to the network device.

5. The position information relay device according to claim 1, wherein the recognizer receives a signal, transmitted by a transmitter, that includes information specific to a position where the transmitter is set, and recognizes the position information of the apparatus from the signal received.

6. The position information relay device according to claim 1, further comprising:

a storage in which the position information recognized by the recognizer is held.

7. The position information relay device according to claim 1, wherein the network protocol is an address resolution protocol (ARP).

8. A position information acquisition system comprising:
a network device;
an apparatus;
a management device that is connected to the apparatus via the network device; and
the position information relay device according to claim 1 that is interposed between the network device and the apparatus.

9. The position information acquisition system according to claim 8, wherein the management device transmits, to the apparatus, a request packet including request information for requesting position information of the apparatus, the relay receives the request packet transmitted by the management device, and transmits the request packet to the apparatus, the apparatus receives the request packet and transmits a response packet to the management device as a response to the request packet, and the relay receives, as the communication packet, the response packet transmitted by the apparatus, includes the position information in the response packet received, and transmits the response packet including the position information to the management device.

10. The position information acquisition system according to claim 8, wherein the management device includes a storage that stores an Internet Protocol (IP) address, a media access control (MAC) address, and the position information of the apparatus in association with each other.

11. The position information acquisition system according to claim 8, wherein the processor is further configured to implement:

a transmitter that transmits a signal including information specific to a position where the transmitter is set, wherein the transmitter is set in a facility.

12. The position information acquisition system according to claim 8, further comprising:

a transmitter that transmits a signal including information specific to a position where the transmitter is set, wherein the transmitter is set outside a facility.

13. A position information relay method performed by a position information relay device interposed between a network device and an apparatus, the position information relay method comprising:

recognizing position information of the apparatus;

receiving a communication packet transmitted by the apparatus to the network device;

including the position information in the communication packet received;

identifying a command of a network protocol in which the communication packet received is used;

determining whether the command of the network protocol identified is a predetermined command;

including the position information in a predetermined field included in the communication packet in response to determining that the command of the network protocol identified is the predetermined command; and transmitting the communication packet including the position information to the network device.

14. A non-transitory computer-readable recording medium having recorded thereon a program causing a computer to execute the position information relay method according to claim 13.

* * * * *